(12) United States Patent
Konno et al.

(10) Patent No.: US 6,237,415 B1
(45) Date of Patent: *May 29, 2001

(54) ANGULAR VELOCITY SENSOR

(75) Inventors: Masashi Konno; Sumio Sugawara, both of Miyagi; Nobuhisa Atoji, Nara; Jiro Terada, Osaka; Masami Tamura, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,737

(22) Filed: Feb. 15, 2000

Related U.S. Application Data

(62) Division of application No. 09/126,277, filed on Jul. 30, 1998, now Pat. No. 6,119,519, which is a division of application No. 08/750,072, filed as application No. PCT/JP96/00926 on Apr. 4, 1996, now Pat. No. 5,824,900.

(30) Foreign Application Priority Data

Apr. 4, 1995 (JP) ......................................................... 7-78713
Apr. 4, 1995 (JP) ......................................................... 7-78714

(51) Int. Cl.⁷ ....................................................... G01P 9/00
(52) U.S. Cl. ........................................................ 73/504.16
(58) Field of Search ........................... 73/504.16, 504.12, 73/504.02

(56) References Cited

U.S. PATENT DOCUMENTS 5,824,900 * 10/1998 Konno et al. ..................... 73/504.16

FOREIGN PATENT DOCUMENTS

| 2-129514 | 5/1990 | (JP) . |
| 3-120415 | 5/1991 | (JP) . |
| 5-231870 | 9/1993 | (JP) . |

* cited by examiner

Primary Examiner—Richard A. Moller
(74) Attorney, Agent, or Firm—McDermott, Will & Emery

(57) ABSTRACT

The invention relates to an angular velocity sensor used in posture control of a moving element or navigation system, and is intended to realize higher sensitivity, lower offset, lower offset drift, lower translation acceleration sensitivity, and higher impact resistance in a small size and at low cost.

Being made of ceramic piezoelectric material or crystal material, the constitution comprises four parallel oscillating arms 12 to 15, or 112 to 115, and a support member 11, or 111 for supporting one end of the oscillating arms or both ends commonly, in which outer two oscillating arms 12, 15, or 112, 115 of a compound tuning fork 10, or 110 in a comb shape of which position of the inside root of two oscillating arms each on inside and outside to the support member 11, or 111 in the oscillating arm direction is matched or different are used in the driving side tuning for, while inner two oscillating arms 13, 14, or 113, 114 are used in the detecting side tuning fork so as to correspond between driving and detection.

17 Claims, 32 Drawing Sheets

ANGULAR VELOCITY SENSOR

This application is a Divisional of application Ser. No. 09/126,277 filed Jul. 30, 1998, U.S. Pat. No. 6,119,519, which is a Divisional of application Ser. No. 08/750,072 filed Apr. 14, 1997, now U.S. Pat. No. 5,824,900, which is a 371 of International Application Serial No. PCT/JP96/00926, filed Apr. 4, 1996.

TECHNICAL FIELD

The present invention relates to an angular velocity sensor used in position control or navigation system of a mobile body such as aircraft, automobile, ship, and vehicle, or in a system for preventing shake of camera or video camera, remote control of audio and video appliances, or personal computer, or detection of rotating motion.

BACKGROUND ART

Various forms of angular velocity sensors have been known hitherto, and from the viewpoint that the entire tuning fork is formed of a ceramic piezoelectric element, as prior art, Japanese Laid-open Patent 3-120415 discloses an oscillating gyro integrally forming two rectangular arms, and a base portion for mutually coupling these arms at their lower ends from a piezoelectric material to form the entire shape into a form of a tuning fork, with the base portion polarized in the direction of Y-axis.

This conventional angular velocity sensor is described below by reference to the drawing.

FIG. 32 is a perspective view of a single-shape tuning fork disclosed in Japanese Laid-open Patent 3-120415.

Directions of polarization are orthogonal, with the base portion in the direction of Y-axis and the driving side oscillating arms in the direction of X-axis. Driving electrodes 3, 4 are partial electrodes of about half of the oscillating arms, and the driving force is $\frac{2}{8}$ times as seen from the use of the entire four sides.

Besides, by Coriolis force, the oscillating arms 1, 2 are bent and oscillated in reverse phases in the X-direction, so that a torsional moment about the Y-axis occurs on the base portion 5. Detecting electrodes 6, 7 are to detect torsional oscillation of the base portion 5, and are high in resonance frequency and low in output sensitivity.

Reference numeral 1 is a driving side oscillating arm, and 2 is a monitor oscillating arm for oscillating stably, and the direction of polarization, which is not indicated herein, is supposed to be in the X-direction considering from the function.

In FIG. 32, however, the role functions are divided, that is, the oscillating arms 1, 2 are used for driving, and the base portion 5 for detecting, and although it is only estimation because the mounting or holding method of the base portion 5 is not disclosed, it may be predicted that the oscillation forms are complicated by mixing of (1) oscillating components in the base portion 5 due to driving and oscillation (flexural oscillation in mutually reverse phases in Y-direction), (2) oscillating components in the base portion 5 due to flexural oscillations in mutually reverse phases in X-direction at the time of action of Coriolis force, (3) torsional oscillating components about the Y-axis of the base portion 5, and (4) disturbance noise components from the holding portions. Accordingly, the separation circuit of these four oscillating components is complicated. Since the oscillation analysis of the base portion of the tuning fork is not elucidated by the mechanical vibration engineering of today, its control seems to be difficult. Therefore, since vibration separation is difficult, it may cause malfunction as the gyro in practical aspect. In particular, it is influenced by disturbance noise transmitted from the holding portion, and it was hard to apply in automobiles, etc.

The torsional oscillation is higher in resonance frequency and smaller in oscillation amplitude as compared with flexural oscillation of cantilever, and is hence low in sensitivity. Therefore, drop of output sensitivity was a cause of temperature drift (fluctuation of detection value due to ambient temperature changes when the input angular velocity is 0).

Moreover, since the driving electrodes 3, 4 in FIG. 32 are provided to the leading end in the Y-axis direction of the oscillating arms, according to the vibration theory of tuning fork, 20 to 30% of the leading end functions as floating capacity, not contributing to driving force at all, and only acts to pick up electric noise, and therefore the ratio of detected signal to electric system noise (hereinafter called S/N) was worsened.

SUMMARY OF THE INVENTION

It is hence an object of the invention to isolate and separate the function of driving side tuning fork and detection side tuning fork, without using base portion complicated in the oscillation form, that is, not using the support portion for detection purpose, remove mechanical coupling oscillation of support portion, prevent driving signal from reaching into the detection side, and enhance the drift performance.

To achieve the object, the angular velocity sensor of the invention is characterized by integrally forming a tuning fork in a comb shape with four parallel oscillating arms made of flat ceramic piezoelectric material or crystal material and a common tuning fork support member, defining the X-axis of the three-dimensional system of coordinates in the width direction of the oscillating arms and support member, the Y-axis in the longitudinal direction of the oscillating arms, and the Z-axis in the thickness direction of the entire tuning fork, preliminarily polarizing partially part of the oscillating arms and support member along the Y-axis in the X-direction by an externally applied voltage, using the outer set of two pieces as the driving side tuning fork and the inner set of two pieces as the detection side tuning fork, or using the inner set of two pieces as the driving side tuning fork and the outer set of two pieces as the detection side tuning fork, disposing driving electrodes along the Y-axis on the face, back and side surfaces of part of the driving side oscillating arms and support member of the tuning fork in comb shape, and detection electrodes divided in two sections along the Y-axis on the face and back surfaces in part of the detection side oscillating arms and support member, corresponding to the partial polarization portions, applying an alternating-current signal to the driving electrodes of the driving side tuning fork to generate flexural oscillations in mutually reverse phases in the X-direction (hereinafter called $X_D$ mode), coupling mechanically the support member to the detection side tuning fork to induce flexural vibrations in mutually reverse phases (hereinafter called $X_S$ mode), and detecting the electric charge quantity generated by flexural vibrations in mutually reverse phases in the Z-axis direction generated by the Coriolis force based on the rotation angular velocity about the Y-axis applied from outside (hereinafter called $Z_S$ mode) by the detecting electrode of the detection side tuning fork.

In this constitution, improving the vibration transmission efficiency, improving the detection sensitivity, preventing undue distribution of driving signal, and enhancing the electrical and mechanical S/N ratio, so that a stable constitution of high performance may be obtained.

BEST MODES OF CARRYING OUT THE INVENTION

First Embodiment

Figure 1:
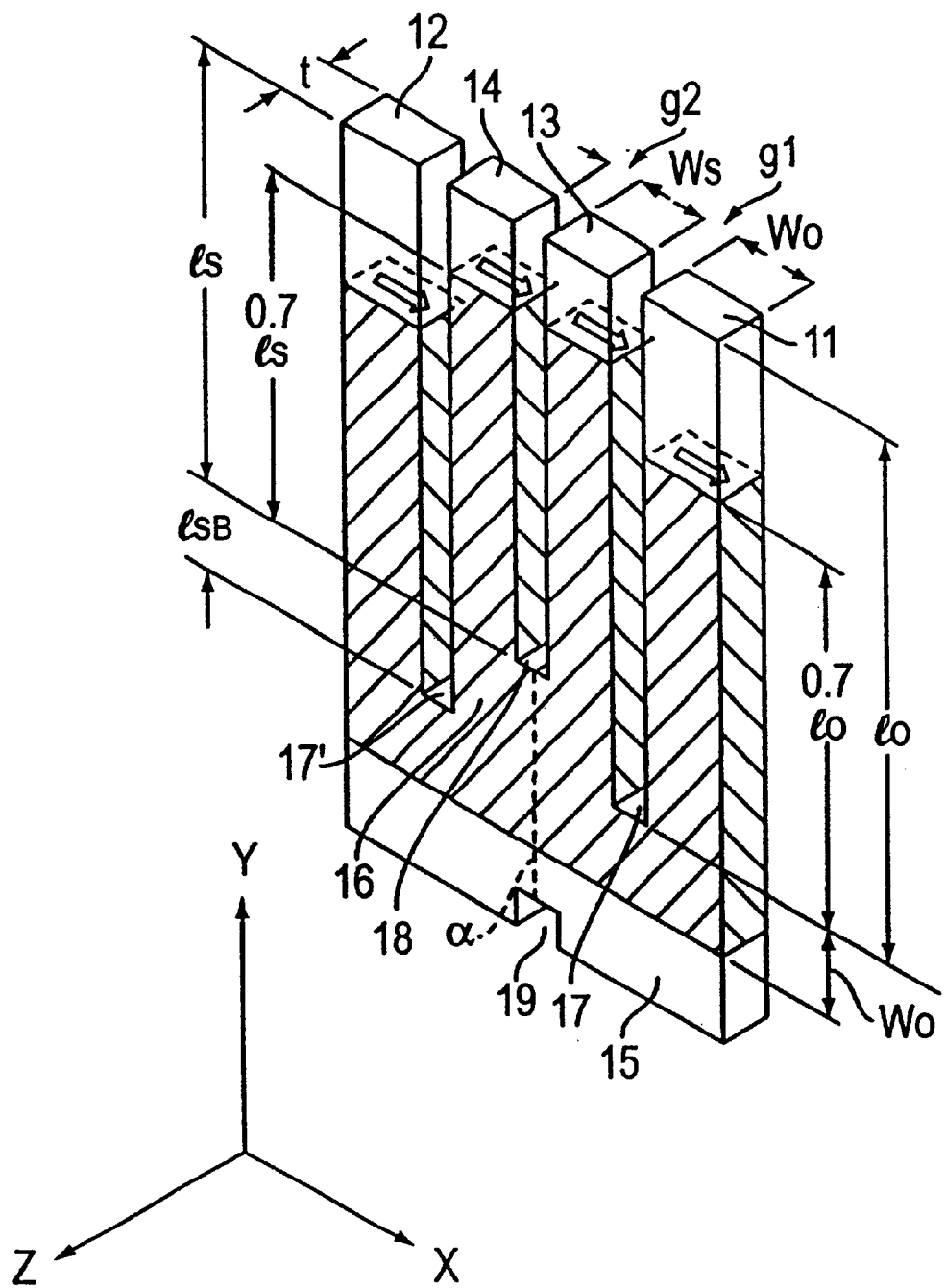
FIG. 1 is a perspective view shoving partial polarization in X-direction of a tuning fork in a comb shape used in angular velocity sensor of ceramic piezoelectric compound type is an embodiment of the invention.

As a first embodiment of the invention, an angular velocity sensor of ceramic piezoelectric compound type is described below.

It is the principle of the invention that the functions of the driving side tuning fork and detection side tuning fork are isolated and separated without using the base portion complicated in the oscillation mode, that is, the support member for detection, and that the oscillating arms in the stable portion of oscillation of tuning fork is used for removing mechanical coupling oscillation of the support member, removing mechanical coupling oscillation of driving signal, preventing driving signal from invading into the detection side, and improving the drift performance.

Next, according to the theory of oscillation engineering, without polarizing the entire oscillating arms, by polarizing about 50% to 80% of the length, more precisely by polarizing 62% considering from the normal function of mechanical oscillation theory and capacity ratio (the ratio of mechanical compliance of a bar and electrostatic capacity), and disposing the driving electrode area and detecting electrode area in the portion corresponding to polarization, the electrode area for maximizing the oscillation amplitude and detection sensitivity by driving force can be optimized.

Moreover, the effective length of oscillating arts of tuning fork contributing to resonance frequency oscillates not only in the length of the oscillating arms but also in the support member, and according to the classical dynamics, it is obtained by adding a length nearly corresponding to the width of the oscillating arms to the length of the oscillating arms from the support member root, and therefore the resonance frequency can be accurately obtained in design by using this effective length so far as the tuning fork is not of a specific shape. Hence, by polarizing the portion corresponding to the effective length of oscillating arms and disposing the electrodes, the output can be picked up without waste, and unnecessary driving oscillation is not caused.

Still more, since there is no polarization or electrode in the extra portion not contributing to driving oscillation or detecting oscillation, it is also intended to have effects of prevention of invading signal by electric coupling due to distribution of electrode and prevention of worsening of S/N ratio due to floating capacity.

The above means of partial polarization and partial electrode in consideration of normal function of mechanical oscillation theory and capacity ratio in equivalent circuit of resonance element cannot be applied in crystal material, and the efficacy is exhibited only in ceramic piezoelectric materials.

Moreover, stable driving of tuning fork is very important for removal of mechanical coupling oscillation or improvement of temperature drift performance. The invention, therefore, comprises a current amplifier for detecting the current occurring in the monitor electrode (hereinafter called monitor electrode) at zero voltage, an AC/DC converter for converting the output of the current amplifier into a DC current signal proportional to the amplitude, and a driving level controller for amplifying the output of the current amplifier depending on the output of the converter to obtain a voltage to be applied to the driving electrode (hereinafter called driving voltage), thereby functioning to keep always constant the monitor current, that is, the driving amplitude.

In addition, as means for detecting the signal proportional to the angular velocity input from the signal of electrode current for detection (hereinafter called detecting current), an orthogonal detection system is employed, and a timing signal for detection is needed. In the invention, this timing signal is obtained by a zero cross comparator for detecting zero cross of output signal of the current amplifier.

In the invention, in order to solve the problems of the conventional angular velocity sensor of integral constitution of ceramic piezoelectric material using the support member as the detecting tuning fork by varying the direction of polarization between the oscillating arms and support member, a compound tuning fork of comb shape is integrally formed from a ceramic piezoelectric material, and the output voltage is optimized by the system of partial polarization and partial electrode applicable to the compound tuning fork, so that the complicated oscillation of the support member can be realized by a separated constitution.

The operation and effect of partial polarization and partial electrode are described below by referring to FIG. 13 and FIG. 14.

Figure 13:
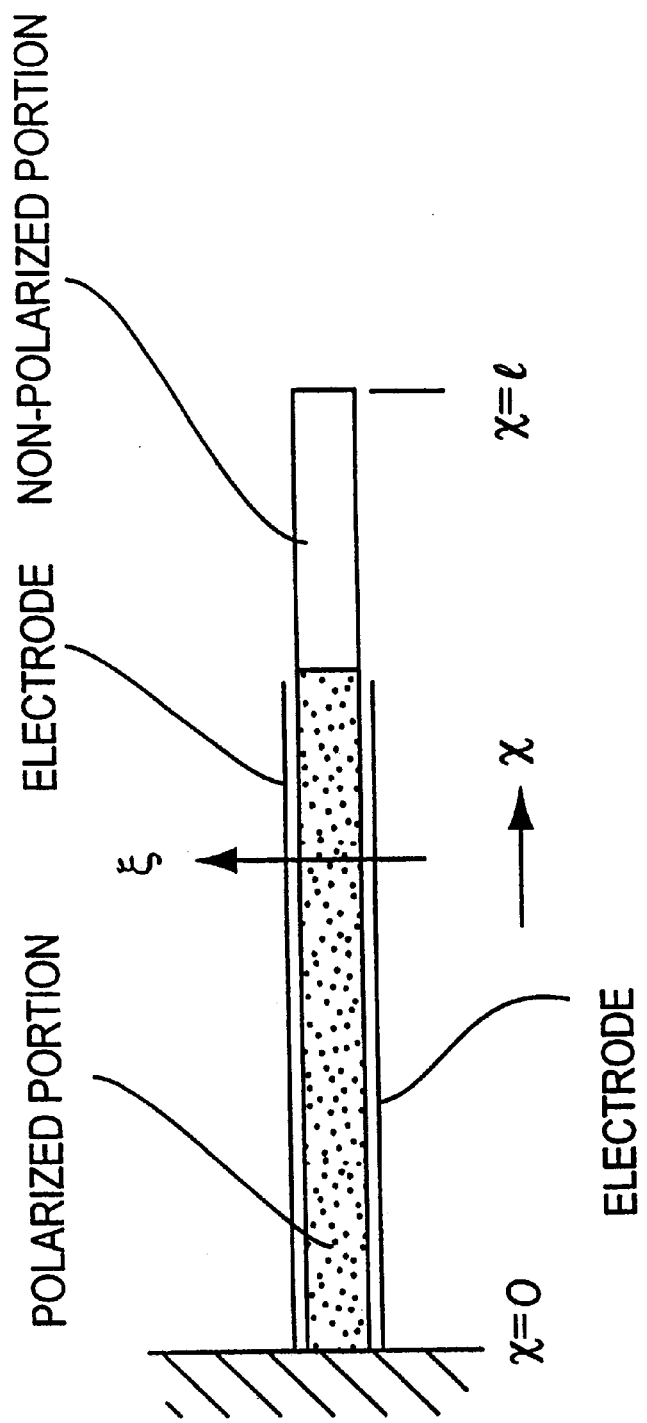
FIG. 13 is a diagram for explaining the theory of partial polarization and partial electrode.
Figure 14:
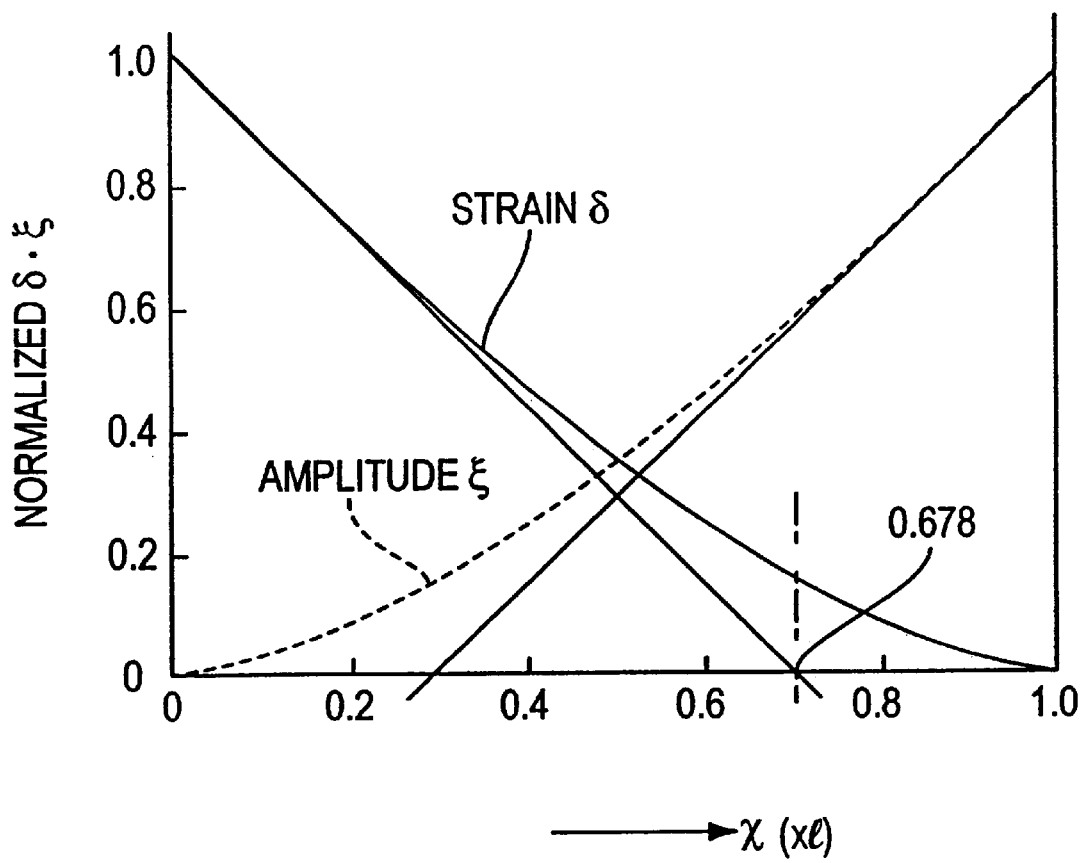
FIG. 14 is an explanatory diagram showing its characteristic.

In FIG. 13, assuming a very slight portion of oscillating arms and support member of a tuning fork to be a cantilever, and supposing the longitudinal direction of the cantilever (that is, the longitudinal direction of the tuning fork) to be x-axis, the amplitude of vertical oscillation orthogonal to the x-axis to be ξ, the arm root to be x=0, and the leading end of oscillating arm to be x=1, the amplitude ξ and the strain δ occurring in the cantilever are expressed by hyperbolic sin and cos by the oscillation engineering theory, and therefore they are not expressed in linear function as shown in FIG. 14. Herein, the mode function is normalized on the axis of ordinates, and it is supposed ξ=1, δ=1.

Accordingly, the detected electric charge proportional to the strain δ of the ceramic piezoelectric bar is larger in output as being closer to x=0, and is smaller in output as being closer to the leading end, and the output is zero at x=1.

On the other hand, according to the theory of electric-mechanical piezoelectric transducer, the output voltage is inversely proportional to the capacity ratio γ of the oscillating arms, and the condition is better when the electrostatic capacity is smaller. By calculating the strain δ curve and capacity ratio function γ, the output can be optimized, and generally it is maximum when x=0.621. Therefore, it is polarized up to x=0.621, that is, about 38% of the leading end is not polarized, and electrode is not disposed, and thereby the loading capacity of the leading end is eliminated and the S/N is improved.

This is analyzed as an ideal cantilever, but actually it varies with the shape of the tuning fork, and in the invention, accordingly, the lover end of the support member is supported on a nodal line α of oscillation, and the support member has a mechanical coupling action and is therefore oscillating slightly, and it cannot be analyzed as a classical cantilever. Hence, by simulation and experiment, in the invention, the range is determined approximately at x=0.5 to 0.81.

Similarly, as for the support member, by avoiding polarization and electrode disposition in the portion not contributing to oscillation, detection of unnecessary oscillation and unnecessary driving may be eliminated, and the S/N ratio may be notably improved.

A second feature of the invention lies in the tuning fork in comb shape integrally formed from a ceramic piezoelectric material. That is, the feature is the constitution in which the outer side of a larger volume is used as the driving side tuning fork, and the inner side of smaller area or volume is used as the detecting side tuning fork, and since the smaller detecting side tuning fork of inner side is put on the larger driving side tuning fork of outer side, the oscillation of the driving side tuning fork can be efficiently transmitted to the detecting side tuning fork. That is, in this tuning fork, the support member of the driving side tuning fork of larger volume and the support member of the detecting side tuning fork oscillate in a common state.

Therefore, reversely, by using the inner set of two pieces as the driving side tuning fork and the outer set of two pieces as the detecting side tuning fork, the action is the same. In this case, the driving force must be increased by increasing the dimensions of the inner side tuning fork or heightening the applied voltage, and it is particularly preferred to consider the shape of the root of the tuning fork.

According to a third feature of the invention, the monitor driving system by self-oscillated circuit is more suited to compound tuning fork separating the functions, than to single tuning fork. In its operation, the amplitude of the monitor current detected at zero voltage is purely proportional to the oscillation level (speed) of the tuning fork. By this means, the AC/DC converter output is proportional to the monitor current, and the controller adjusts the drive voltage so that the AC/DC converter output may be always constant.

Since the oscillation level of tuning fork varies in proportion to the drive voltage, the oscillation level of the tuning fork is always kept constant. As a result, the tuning fork oscillation is stable, and the drift performance is enhanced.

The angular velocity sensor of ceramic piezoelectric compound type of the embodiment is further described below while referring to the drawings.

First, FIG. 1 shows an embodiment comprising four parallel oscillating arms 11, 12, 13, 14 made of flat ceramic piezoelectric plates, with the oscillating arms 11, 12 used for driving and oscillating arms 13, 14 for detecting, being integrally formed as a tuning fork in comb shape from these oscillating arms 11 to 14 and common support members 15, 16 of tuning fork, in which the X-axis of the three-dimensional system of coordinates corresponds to the width direction of oscillating arms and support members, the Y-axis to the longitudinal direction of comb shape, and the Z-axis to the thickness direction of the entire tuning fork, and the portions for partial polarization and dimension symbols are defined below.

$l_D$ and $l_S$ represent the length of the driving side oscillating arms 11, 12, and detecting side oscillating arms 13, 14, respectively, referring to the length from roots 17, 17' of the oscillating arms 11, 12 and root 18 of the oscillating arms 13, 14 to the leading end, $l_{SB}$ denotes the length of support member 16 of detecting side tuning fork, referring to the distance between the roots 17 and 18.

$W_D$ is the width of driving side oscillating arms 11, 12, $W_S$ is the width of detecting side oscillating arms 13, 14, t is the thickness of oscillating arms 11 to 14 and support member 15, 16, that is, the entire tuning fork, $g_1$ is the slit interval of driving side oscillating members 11, 12, and $g_2$ is the slit interval of detecting side oscillating arms 13, 14, Reference numeral 19 denotes a notch provided in the lower part of the support member 15, on nodal line α (indicated by dotted line in FIG. 1) of reverse phase flexural oscillation in the Z-axis direction by action of Corioli's force, that is, oscillation in $Z_S$ mode, and it is presented for holding or mounting the angular velocity sensor. Instead of notch, meanwhile, if 19 is a small hole, its action is the same.

The blank arrow indicates the direction of polarization, the shaded area refers to the polarized portion, and the blank area shows the non-polarized portion. That is, the length of about $0.7l_D$ of oscillating arms 11, 12 and about $W_D$ at the support member 15 side in the driving side tuning fork of the outer set of two pieces, and the volume portion made of about $0.7l_S$ of oscillating arms 13, 14 and length of $l_{SB}$ + about $W_D$ at the support member 16 side in the detecting side tuning fork of the inner set of two pieces are preliminarily polarized partially so that the DC voltage may penetrate in the X-direction by an external applied voltage of 3 to 4 kV/mm.

Figure 2:
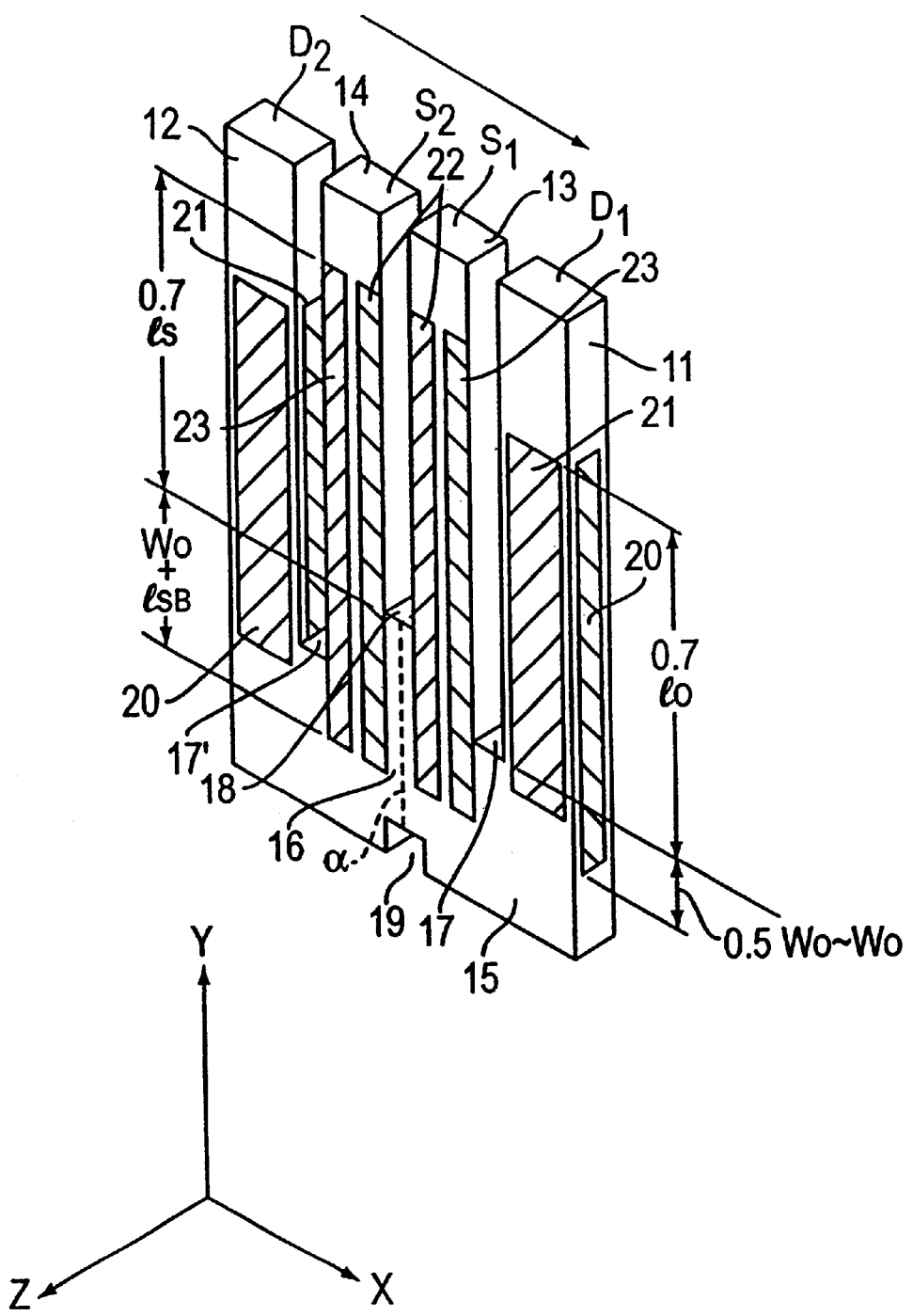
FIG. 2 is a perspective view in a state of installing electrodes in the same tuning fork in comb shape.

FIG. 2 shows a constitution of driving electrode and detecting electrode after partial polarization, and basically electrodes are disposed corresponding to the polarized portion in FIG. 1. Concerning the driving electrodes, the polarized electrodes can be directly utilized, but polarized electrodes are provided at the side of the oscillating arms 13, 14 of the inner detecting side tuning fork, and are removed after polarization. The drawing shows the state after removal. The length of the driving electrode at the support member side is preferred to be about 0.5 to 1 times the width $W_D$ of the oscillating arm.

In FIG. 2, + side and − side driving electrodes 20, 21 are formed on four sides of the driving side oscillating arms 11, 12, and + side and − side detecting electrodes 22, 23 are formed parallel at the face surface and back surface of the detecting side oscillating arms 13, 14.

Figure 3:
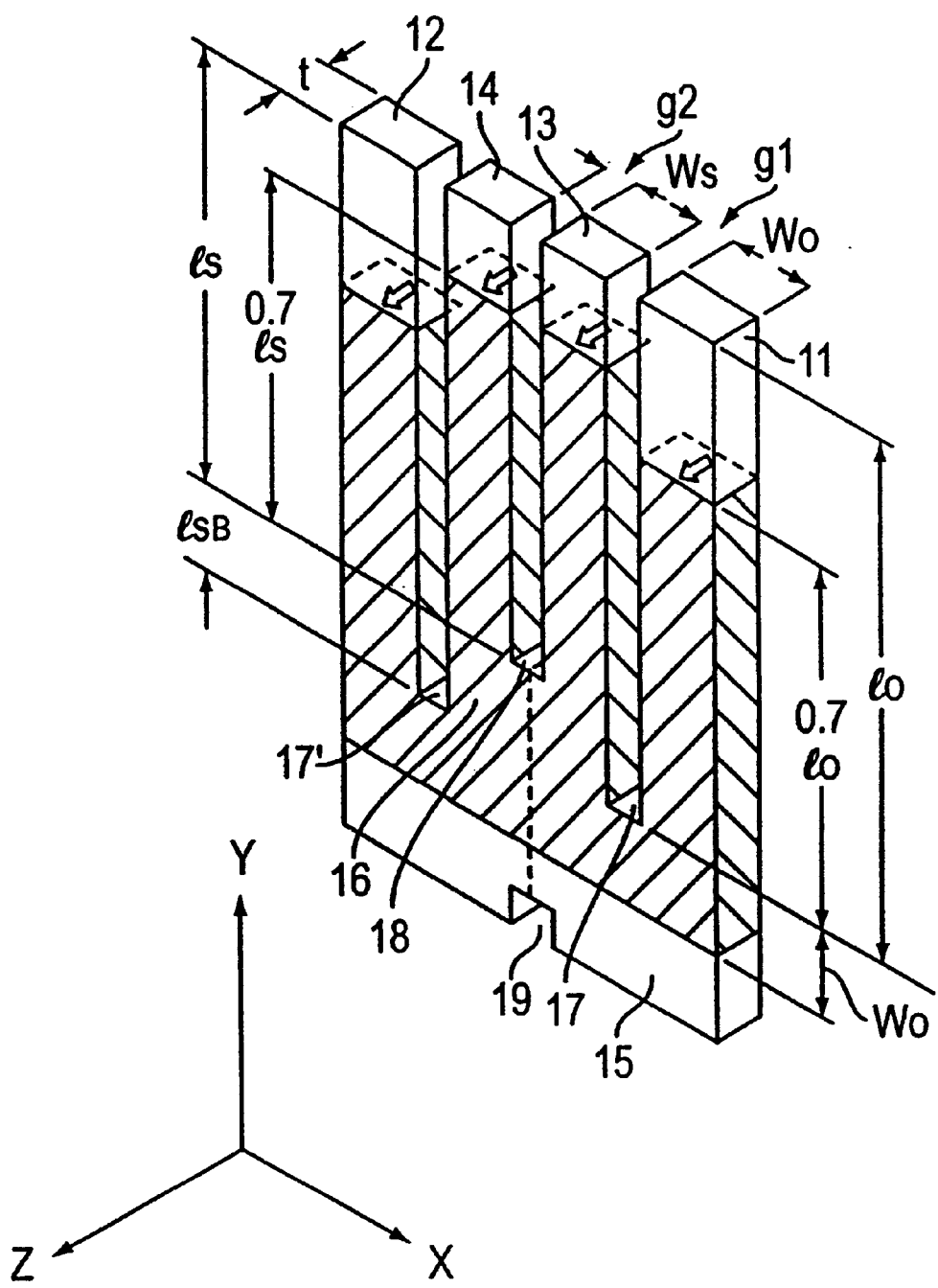
FIG. 3 is a perspective view shoving partial polarization in the Z-direction of the same tuning fork in comb shape.
Figure 4:
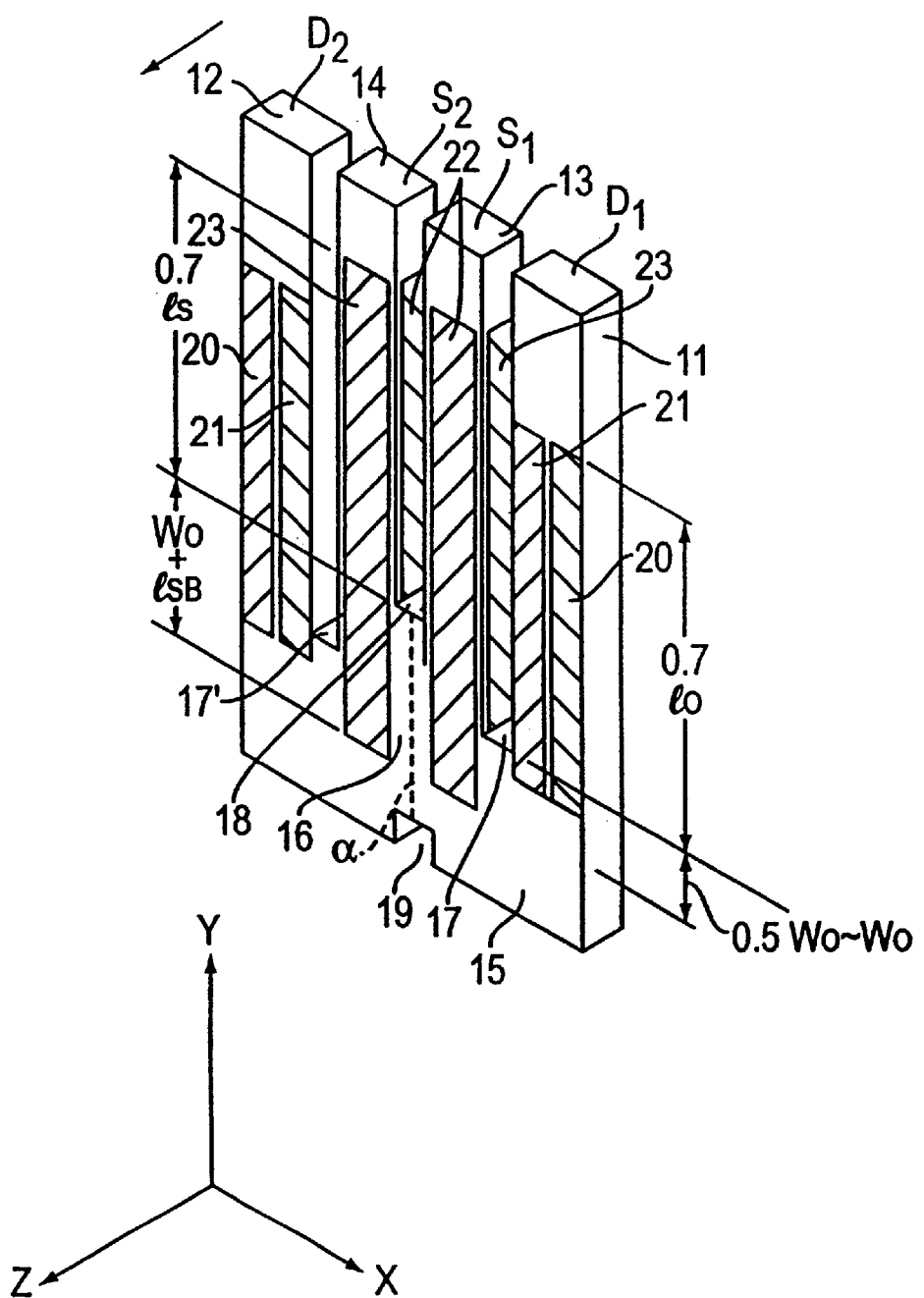
FIG. 4 is a perspective view showing the state of installing electrodes in the same tuning fork in comb shape.

FIG. 3 refers to an embodiment in which the direction of polarization is the Z-direction only, that is, the thickness direction of tuning fork, and the polarized portions are same as in FIG. 1 When the direction of polarization is the Z-axis, the structure of driving and detecting electrodes is inverted, and as shown in FIG. 4, driving electrodes 20, 21 are divided in two sections in the Y-axis direction of oscillating arms 11, 12, and detecting electrodes 22, 23 are provided at both face and back surfaces of oscillating arms 13, 14.

Figure 5:
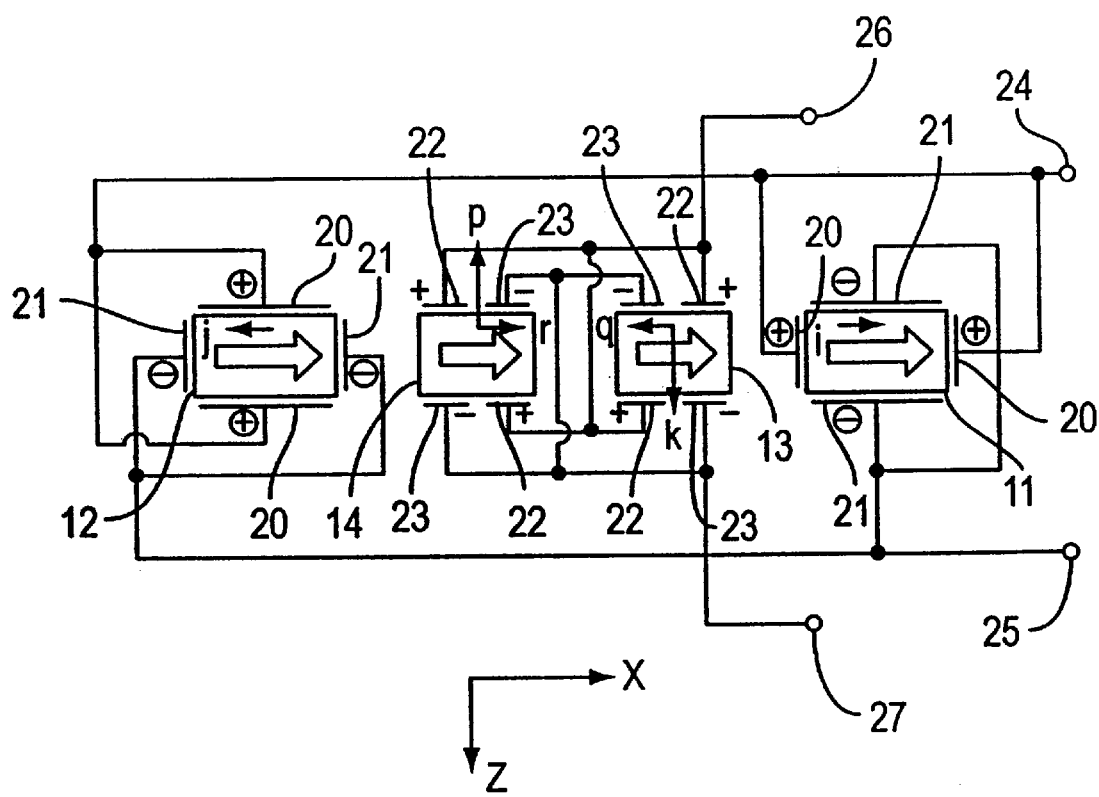
FIG. 5 is a wiring diagram of driving and detecting circuit with electrode composition of polarization in the X-direction of the same.
Figure 6:
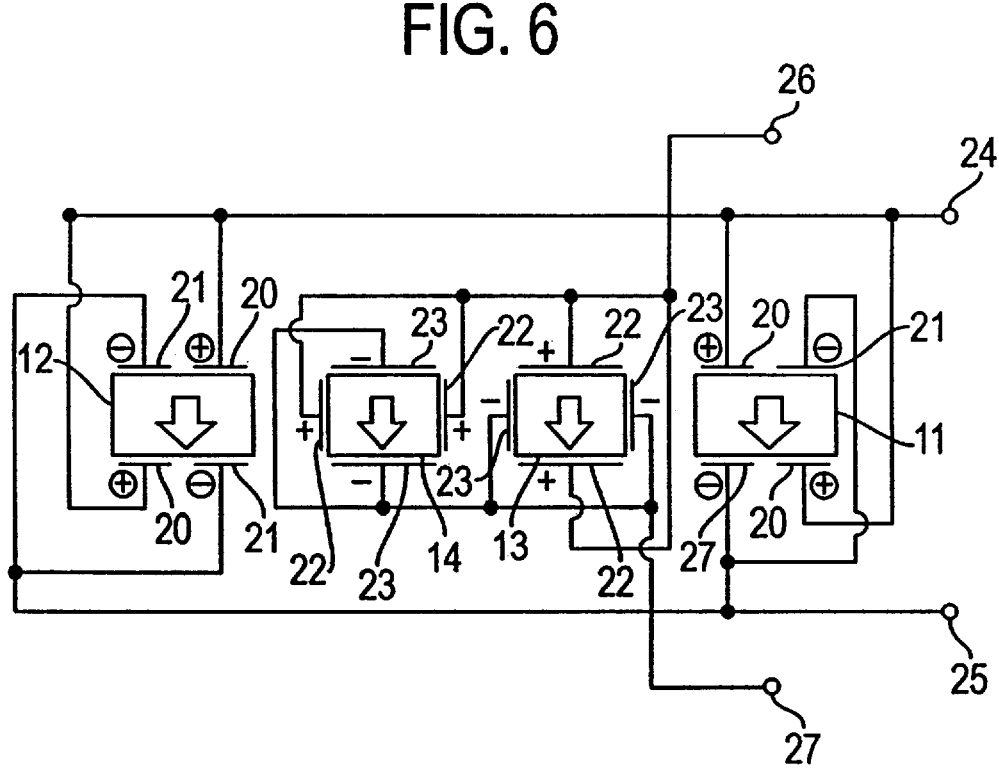
FIG. 6 is a wiring diagram of driving and detecting circuit with electrode composition of polarization in the Z-direction of the same.

FIG. 5 and FIG. 6 illustrate the electrode composition and wiring diagram corresponding to FIG. 1 and FIG. 3. This is described below.

As shown in FIG. 5, by wiring commonly so that the face and back surfaces of the driving side oscillating arm 12 may come to the + side driving electrode 20, the side surface to the − side driving electrode 21, the face and back surfaces of the driving side oscillating are 11, reversely, to the − side driving electrode 21, and the side surface to the + side driving electrode 20, an input terminal 24 of the sensor is a positive electrode of driving signal, and an input terminal 25 is a negative electrode. By applying an AC signal continuously between the input terminals 24 and 25, the driving side oscillating arms 11, 12 maintain the flexural oscillation ($X_D$ mode) in mutually reverse phases, in directions i and j of the X-axis. This $X_D$ mode oscillation induces the flexural oscillation ($X_S$ mode) in mutually reverse phases in directions q and r of the detecting side oscillating arms 12, 13 through mechanical coupling of the support members 15, 16.

By forming the detecting electrodes 22, 23 divided in two sections only on the face and back surfaces of the oscillating arms 13, 14 of the detecting side tuning fork, when a rotational angular velocity (ω) is applied from outside about the Y-axis, the oscillating arm 13 moves, for example, in the direction of arrow k by Corioli's force, then the oscillating arm 14 moves in the direction of arrow p ($Z_S$ mode), and hence an electric charge of (−, +) is generated in the detecting electrodes 22, 23 on the face surface of the oscillating arm 13 as shown in FIG. 5, while a reverse electric charge of (+, −) is generated in the detecting electrodes 22, 23 on the back surface.

On the other hand, to the contrary, an electric charge of (+, −) is generated on the detecting electrodes 22, 23 on the face surface of the oscillating arm 14, and a reverse electric charge of (−, +) is generated on the detecting electrodes 22, 23 on the back surface. By mutually wiring the same poles of electric charge, and connecting the + side of the detecting terminal 26 and the − side to the detecting terminal 27, a potential difference is detected between the detecting terminals 26 and 27.

Driving electrodes 20, 21 in FIG. 6 are electrodes divided in two sections, diagonal sides of face and back surfaces of the oscillating arm 12 are set as + side driving electrode 20 and − side driving electrode 21, and the oscillating arm 11 is commonly wired symmetrically to be + side driving electrode 20 and − side driving electrode 21 and an input terminal 24 of the sensor is a positive pole of driving signal, and an input terminal 25 is a negative pole. By applying an AC signal continuously between the input terminals 24 and 25, the oscillating arms 11, 12, 13, 14 induce oscillations ($X_S$ mode) in directions q and r by oscillations in directions i and j ($X_D$ mode), same as in FIG. 5.

By forming the detecting electrodes 22, 23 on the face, back and side surfaces of the oscillating arms 13, 14 of the detecting side tuning fork, when a rotational angular velocity (ω) is applied from outside about the Y-axis, the oscillating arms 13, 14 oscillate in reverse phases ($Z_S$ mode) in directions k and p, and an electric charge of (+) is generated on the face and back surfaces of the oscillating arm 13, and an electric charge of (−) is generated on both side surfaces, and completely reverse electric charges are generated in the oscillating arm 14. By mutually wiring the same poles of electric charge, and connecting the + side of the detecting terminal 26 and the − side to the detecting terminal 27, a potential difference is detected between the detecting terminals 26 and 27.

Concerning the angular velocity sensor in FIG. 3, an example of specific design dimensions is presented below, and the holding or mounting position is determined by a hole 19 (see FIG. 7). By setting the dimensions of:

Length of driving side oscillating arms 11, 12 . . . $l_D$=20 mm

Thickness of tuning fork . . . t=1.5 mm

Width of driving side oscillating arms 11, 12 . . . $W_D$=2.9 mm

Width of detecting side oscillating arms 13, 14 . . . $W_S$=2.0 mm

Length of detecting side oscillating arms 13, 14 . . . $l_S$=17 mm

Length of support member 16 of detecting side tuning fork . . . $l_{SB}$=3.1 mm

Slit interval of driving side oscillating arms 11, 12 . . . $s_1$=3.0 mm

Slit interval of detecting side oscillating arms 13, 14 . . . $s_2$=4.0 mm the resonance frequency was adjusted by trimming, and the $X_D$ mode resonance frequency was set to $f_{DX}$=9830 Hz, $f_{SZ}$=5335 Hz. In this embodiment, the driving resonance frequency $f_{DX}$ and detecting resonance frequency $f_{SZ}$ are different from each other. This ceramic material is a composition of three major components $Pb(Mg_{1/3}Nb_{2/3})O_3$—$PbTiO_3$—$PbZrO_3$ (hereinafter called PCM system), and is obtained by sintering. This PCM system was used at X-direction Young's modulus of Ex=7.945×10$^{11}$ (N/m$^2$), Z-direction Young's modulus of Ez=7.862×10$^{11}$ (N/m$^2$), and density of ρ=7.645×19$^3$ (kg/m$^3$).

Aside from the composition used in the above embodiment, the composition mainly composed of perovskite crystal structure such as $PbtiO_3$, $Pb(Zr—Ti)O_3$, $LiNbO_3$, $LITaO_3$, and tungsten-bronze type crystal structure such as $PbNb_2O_3$, or their compound metal oxide may be similarly used, and same effects can be obtained.

As a second specific design example, in the case of $f_{DX} \neq f_{SX}$ and $f_{DX} \neq f_{SZ}$, in the above example, supposing to adjust at $W_D$ without varying the length of the oscillating arms, the conditions are Width of driving side oscillating arms 11, 12 ... $W_D$=1.66 mm Other specifications ... All same as above and therefore the resonance frequencies are $f_{DX}$=534 Hz, and $f_{SZ}$=5335 Hz, which are slightly different because the effective length of the oscillating arms varies with the width $W_D$, $W_S$ and thickness t of the oscillating arms, and hence the resonance frequency was set at $f_{DX} \neq f_{SZ} \neq 5342$ Hz by trimming.

Incidentally, the degree of approximation of $f_{DX} \neq f_{SZ}$ in resonance type design should be set depending on the frequency characteristic of sensor output with respect to the input angular velocity ω applied from outside.

Trimming was executed by methods of cutting obliquely the corner of the leading end of oscillating arm, cutting the root of oscillating arm in V-groove, cutting the bottom of support member, or adhering and adding a small mass to the leading end, according to known methods.

Figure 7:
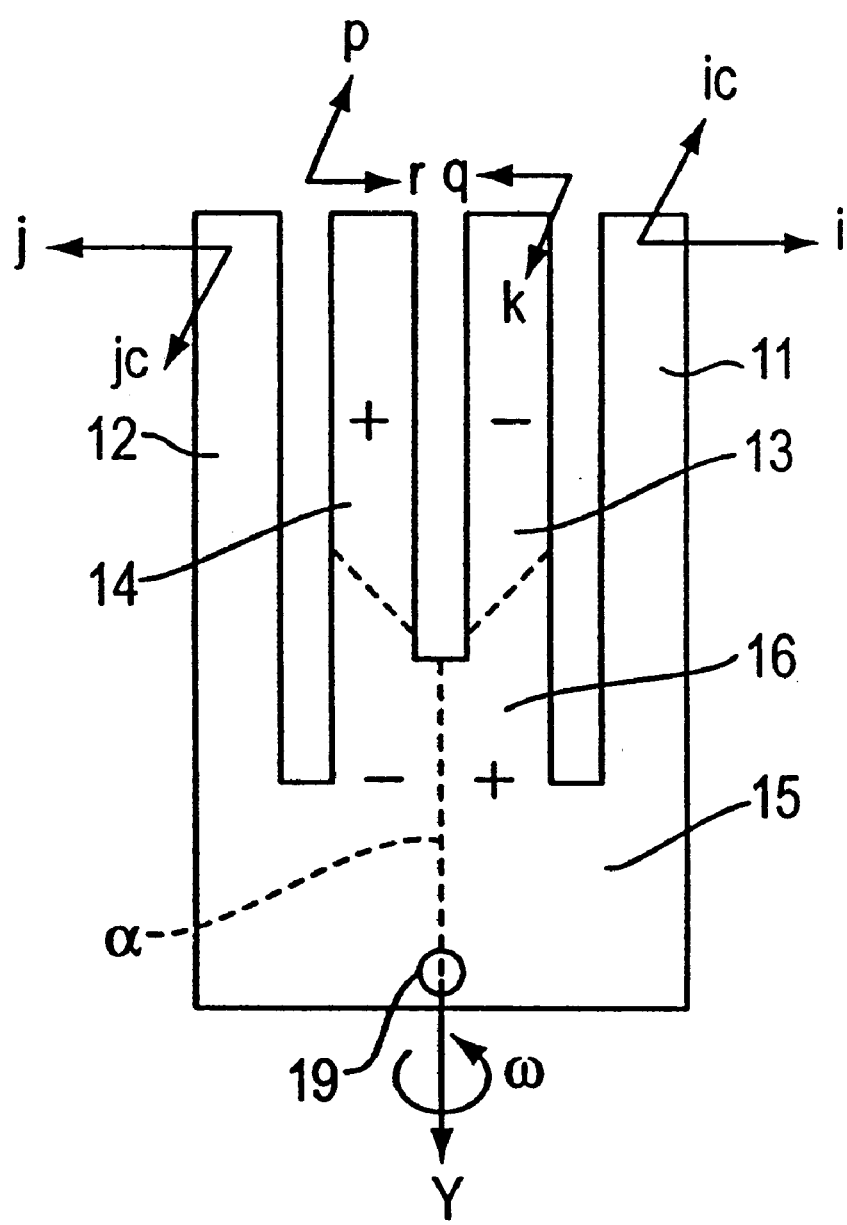
FIG. 7 is a diagram for explaining the vibration mode and holding position of the same tuning fork.

The position for holding or mounting the tuning fork is described while referring to FIG. 7.

FIG. 7 is a diagram for explaining the oscillation mode, in which signs + and − refer to the amplitude phases of $Z_S$ mode of the detecting side tuning fork when Coriolis force acts.

When the driving oscillating arms 11, 12 are in the driving mode in X-direction, that is, $X_D$ mode, the oscillating arms 13, 14 of the detecting side tuning fork are induced in the oscillation mode of q and r narrowing at the inner side, that is, $X_S$ mode. At this time, when an angular velocity of ω is applied from outside about the Y-axis, the oscillating arm 13 oscillates in the nearer direction k, and the oscillating arm 14 oscillates in the further direction p, defining this to be $Z_S$ mode, in the $Z_S$ mode in the thickness direction of tuning fork, the center line of the tuning fork is the nodal line α (indicated by dotted line) of oscillation in the direction of Y-axis, and the support member 16 of the detecting side tuning fork is + and − in the left and right amplitude phases from the boundary of line α, and the oscillating arms 13, 14 are in reverse phase. By supporting on the line α, it is a supporting method resistant to external disturbance noise, without braking the oscillation of the detecting tuning fork. Moreover, the location small in effect on driving side machine impedance is preferred to be as low as possible on the line α.

The tuning fork type crystal oscillator presently used in clock or the like resonates only in the X-direction, that is, in the width direction of the tuning fork, and therefore, if the bottom of the tuning fork support member is fixed, effect on resonance can be practically ignored, but in reverse phase oscillation in the Z-direction, that is, the thickness direction of tuning fork, if the bottom of the support member is fixed or support, it has a significant effect on resonance, and hence the supporting method of the invention is a very rational method.

For reference, the design method of resonance frequency is described below by reference to FIG. 1 of the embodiment. The tuning fork oscillating arms shown in FIG. 1 may be handled as cantilevers from the theory of electric and acoustic oscillation engineering, but the effective length of the tuning fork oscillating arms is longer than $l_D$, and supposing to be $h_D$, the resonance frequency $f_{DX}$ of $X_D$ mode is expressed in formula 1.

$$f_{DX} = \frac{\alpha^2}{2\pi\sqrt{12}} \cdot \frac{A \cdot X_D}{h_D^2} \sqrt{E_X/\rho} \qquad (1)$$

where α=1.875 (frequency normal constant)

Ex: Young's modulus of ceramic piezoelectric material in X-axis direction

ρ: density of ceramic piezoelectric material

A: factor determined by interval dimensions $g_1$, $g_2$ of support member and oscillating arms of tuning fork.

The resonance frequency fsx of $X_S$ mode of detecting tuning fork side induced in $X_D$ mode is, supposing the effective length of detecting side oscillating arms to be hs, expressed in formula 2.

$$f_{SX} = \frac{\alpha^2}{2\pi\sqrt{12}} \cdot \frac{B \cdot X_S}{h_S^2} \sqrt{E_X/\rho} \qquad (2)$$

where B: factor determined by length $l_{SB}$ of support member of tuning fork, and interval dimensions $g_1$, $g_2$ of oscillating arms, a value very close to A The design condition of mechanical coupling of the tuning fork support member for inducing $X_S$ mode is formula 1=formula 2, and hence formula 3 is obtained.

$$\frac{A \cdot X_D}{h_D^2} = \frac{B \cdot X_S}{h_S^2}, \quad \text{that is,} \quad \frac{AX_D}{BX_S} = \frac{h_D^2}{h_S^2} \qquad (3)$$

Therefore, as the guideline of design of shape and dimensions of the tuning fork, it is known that it should be designed to satisfy formula 3.

Incidentally, by selection of three resonance frequencies, depending on the design of $W_D$, $W_S$, and $l_D$, the relation $l_S \geq l_D$ is also possible.

Next, as for the resonance frequency $f_{SZ}$ of Z mode, since it is experimentally known that the effective length of oscillating arms in Z mode is longer than $h_S$, supposing it to be $h_Z$, it may be expressed in formula 4.

$$f_{SZ} = \frac{\alpha^2}{2\pi\sqrt{12}} \cdot \frac{t}{h_Z^2} \sqrt{E_X/\rho} \qquad (4)$$

where Ez: Young's modulus of ceramic piezoelectric material in the Z-axis direction If the tuning fork design of resonance type is the condition, it is enough by satisfying formula 2=formula 4, or formula 1=formula 4, that is, formula 5 or formula 6 is obtained.

$$t/(BW_S)=(h_Z/h_S)^2\sqrt{E_X}/\sqrt{E_Z} \qquad (5)$$

$$t/(AW_D)=(h_Z/h_D)^2\sqrt{E_X}/\sqrt{E_Z} \qquad (6)$$

Hence, the ratio of thickness (t) and widths ($W_S$), ($W_D$) of the detecting side tuning fork oscillating arms may be determined from the effective lengths of oscillating arms $(h_Z/h_S)^2$ and $(h_Z/h_D)^2$ by measuring their Young moduli $E_Z$, $E_X$.

In the design condition satisfying both formula 3 and formula 5, that is, by equalizing the three frequencies $f_{DX}$, $f_{SX}$, and $f_{SZ}$, a high sensitivity is expected, but it takes much time and labor in adjustment of frequency in manufacture, and the cost is raised, and therefore the case of $f_{DX}=f_{SX}\neq f_{SZ}$ and $f_{SZ}=f_{DX}\neq f_{SX}$ is preferred. The Q value of resonance of ceramic material is lower than that of crystal, and in the PCM material used herein, Q is about 800 to 1000, and it is easier to manufacture at $f_{DX}=f_{SX}$ as compared with crystal. Further, by making use of degeneracy phenomenon, it may approximately set at $f_{DX}\neq f_{SX}$.

Figure 8:
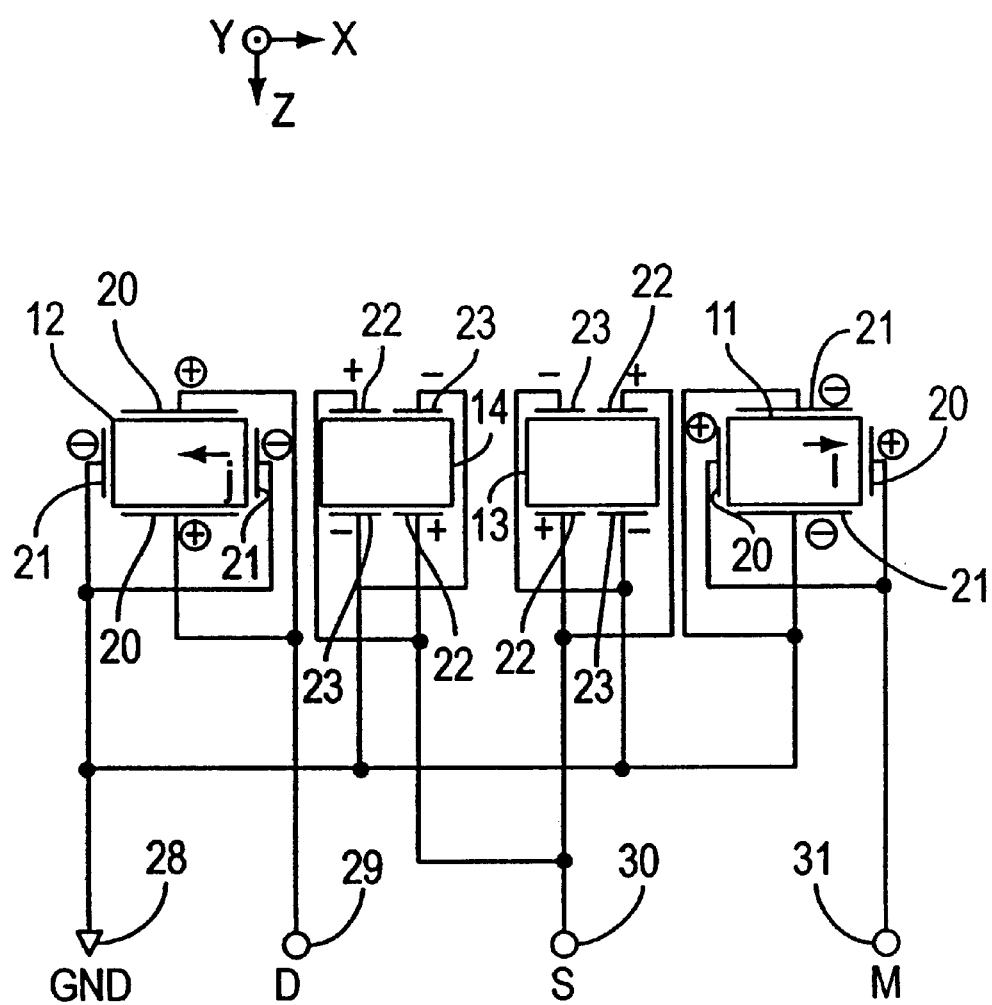
FIG. 8 is a wiring diagram of monitor driving and detecting system of the tuning fork in the case of polarization in the X-direction.
Figure 9:
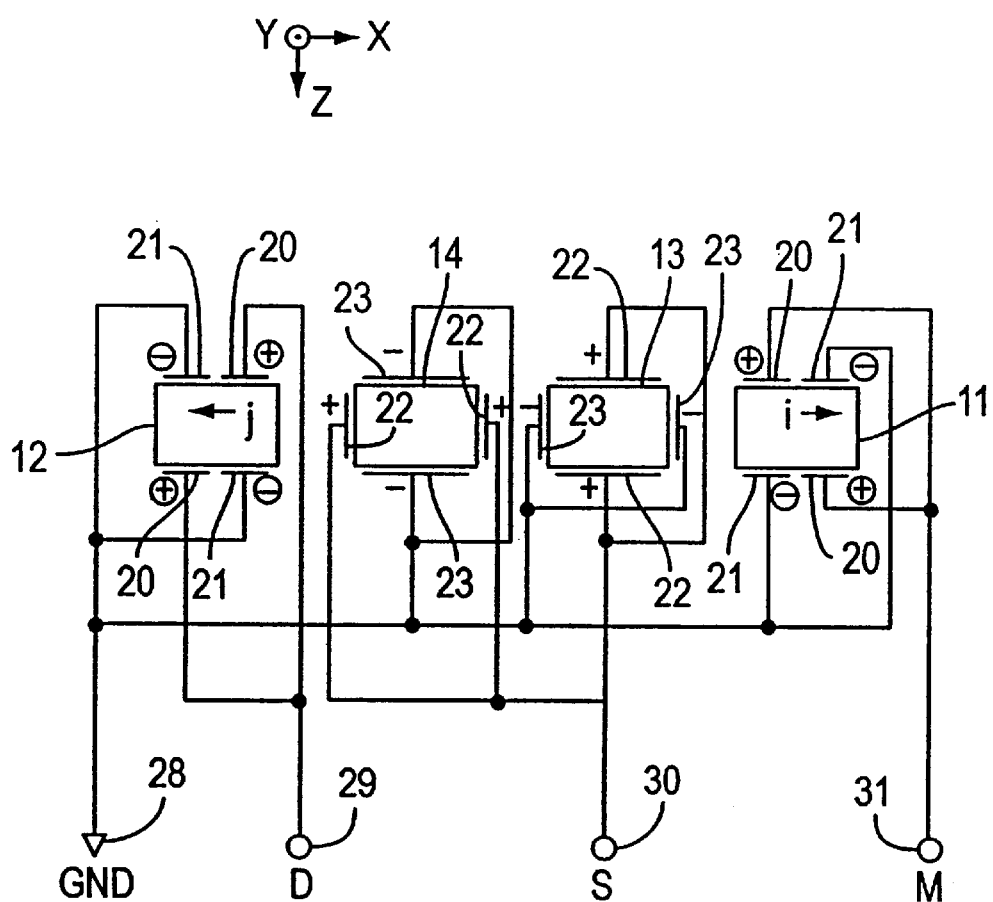
FIG. 9 is a wiring diagram of monitor driving and detecting system of the tuning fork in the case of polarization in the Z-direction.

Finally, the angular velocity sensor composed of the ceramic piezoelectric material of the embodiment and an embodiment of circuit system for driving and detecting it are described by referring to the drawings. FIG. 8 and FIG. 9 are wiring diagrams of monitoring method corresponding to FIG. 5 and FIG. 6. FIG. 8 and FIG. 9 are block diagrams of driving and detecting circuit, and FIG. 10 shows qualitative action waveforms of parts.

In FIG. 8 and FIG. 9, reference numeral 28 is a GND electrode as reference potential of signal, 29 is a driving electrode, 30 is a detecting electrode, and 31 is a monitor electrode. In FIG. 10, reference numeral 32 is a current amplifier of monitor circuit, 33 is a charge amplifier of detecting circuit, 34, 35 are AC voltage amplifiers, 36 is a driving voltage controller, 37 is an AC/DC converter, 38 is a zero cross comparator, 39 is an orthogonal detector, and 40 is a integral DC amplifier.

Figure 10:
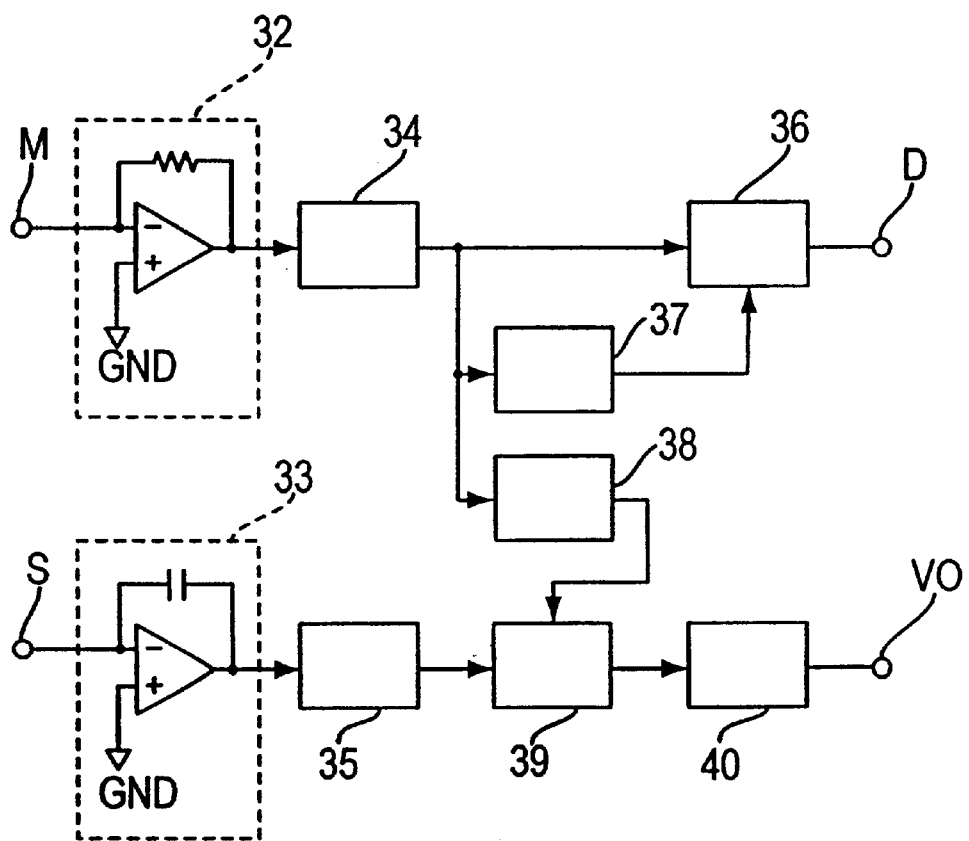
FIG. 10 is a block diagram of driving and detecting circuit of the same tuning fork in comb shape.
Figure 11A:
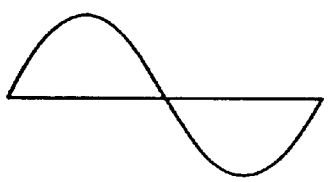
FIG. 11(a) to (g) are operation waveform diagrams of parts in the circuit block.
Figure 11B:
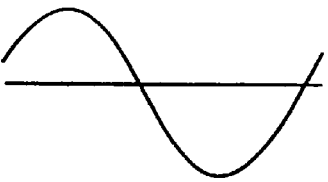
Figure 11C:
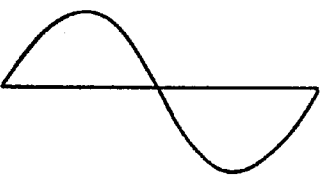

FIG. 8, FIG. 9, and FIG. 10 show a known monitor system for stabilizing self-oscillation, and it is also a feature of the invention to apply to compound type ceramic piezoelectric tuning fork and obtain new effects. By applying an AC voltage shown in FIG. 11(a) to the driving electrode 29 from the driving voltage controller 36, the oscillating arms of the comb shaped tuning fork oscillate in $X_D$ mode and $X_S$ mode, and an AC electric charge is generated in the monitor electrode 31 (the current flowing by generation is hereinafter called monitor current), and the current is detected by the current amplifier 32 while the voltage is zero, and is positively fed back to the driving voltage 29 through the actions of the AC voltage amplifiers 34, 35, and driving voltage controller 36. Since the tuning fork is a kind of mechanical filter for amplifying only the resonance frequency, and the positive feedback loop from the oscillating arm 11 to the oscillating arm 12 is a resonance frequency self-oscillation circuit of a very large sharpness (Q value). In a single tuning fork, the monitor electrode and detecting electrode must be disposed on one oscillating arm, and in the $f_{DX}=f_{SZ}$ system (resonance type tuning fork design), the circuit of signal processing is complicated, and the S/N is poor and the cost is high.

Reference is made also to FIG. 11. The Coriolis oscillation of $Z_S$ mode deviated in phase by 90 degrees from X direction is detected by the detecting electrode 30 as a detection current (current at zero voltage) shown in FIG. 11(d) deviated in phase by 90 degrees from the monitor current shown in FIG. 11(c).

Figure 11D:
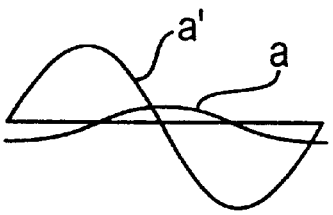
Figure 11E:
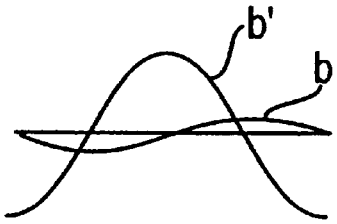
Figure 11F:
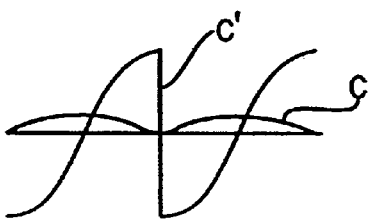
Figure 11G:
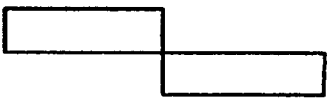

On the other hand, from the detecting electrode 30, a coupling detecting current a' shown in FIG. 11(d) at zero voltage in phase with the monitor current by $X_S$ mode coupling oscillation (hereinafter called $Z_{MS}$) mechanically coupled with $X_D$ mode oscillation is also detected. This coupling detecting current a' is generally very large as compared with the detecting current a by Coriolis force, and is detected in superposition, so that it is necessary to separate them. Accordingly, both currents are integrated in the charge amplifier 33 to obtain a charge signal as shown in FIG. 11(e), and then from the in-phase comparative signal of monitor current shown in FIG. 11(c), an orthogonal detection timing signal shown in FIG. 11(g) is created by using the zero cross comparator 38. Using it as detection signal, when orthogonal detection is conducted on the charge signal in FIG. 11(e) by the orthogonal detector 39, the charge signal b in FIG. 11(e) is inverted by the zero cross point of monitor current in FIG. 11(c), and the orthogonal detection output c in FIG. 11(f) is obtained. By passing it through the integral DC amplifier 40, the waveform derived from the detecting current is issued as effective DC value by Corioli's force shown in the orthogonal detection output c in FIG. 11(f), and waveform c' derived from coupling current becomes zero as a result of integration, so that the both currents are separated.

Figure 12:
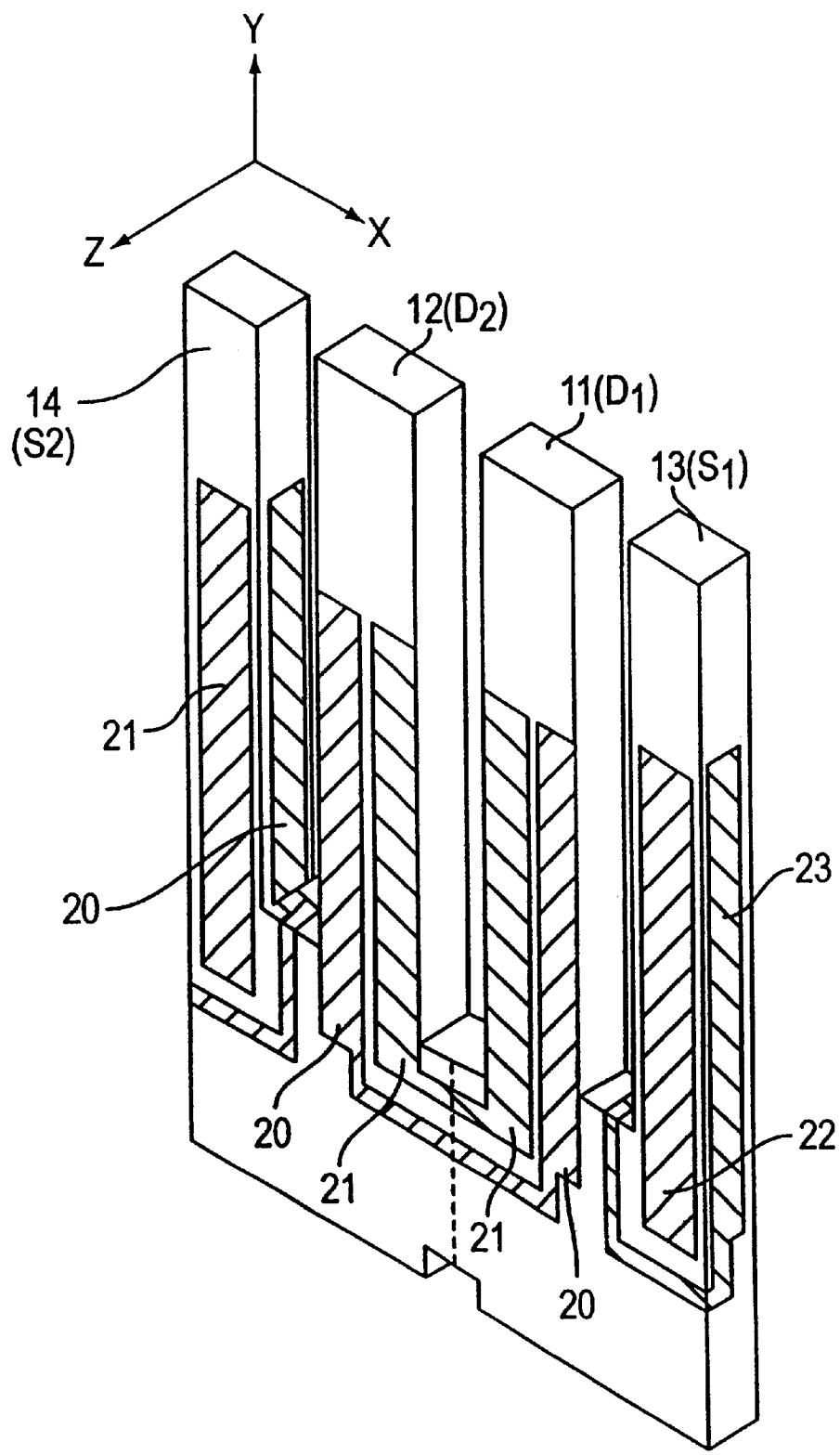
FIG. 12 is a perspective view of polarizing in the thickness direction, using the inner tuning fork for driving in other embodiment of the invention.

FIG. 12 is a modified example of the invention, in which inner two oscillating arms are driving side oscillating arms 11, 12 to form the driving side tuning fork, outer two are detecting side oscillating arms 13, 14 to form the detecting side tuning fork, and the thickness direction of tuning fork (Z-axis direction) is partially polarized. The electrode numerals correspond to those in FIG. 9.

Figure 32:
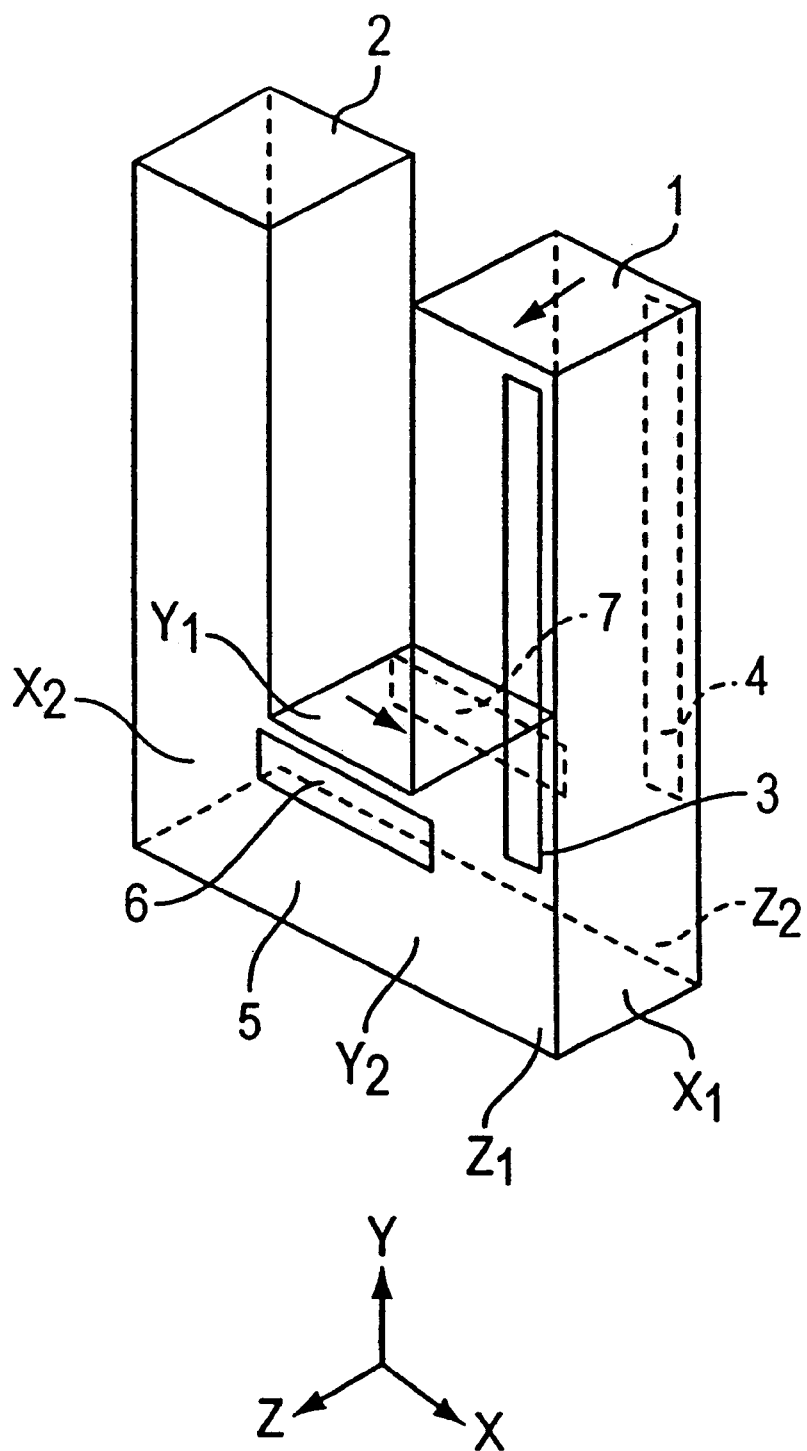
FIG. 32 is a perspective view of a conventional angular velocity sensor.

In this embodiment of the angular velocity sensor of ceramic piezoelectric compound type, the S/N ratio of output sensitivity by Coriolis force is improved by about 15 to 18 dB as compared with the prior art in FIG. 32, and it has been confirmed that the angular velocity sensor of ceramic piezoelectric compound type outstanding small in temperature drift (depending on S/N) can be presented at low cost.

Second Embodiment

As a second embodiment of the invention, a crystal angular velocity sensor is described below by referring to the accompanying drawings.

First, using a tuning fork in comb shape, the driving detection system of so-called monitor type is mainly described below.

After describing the constitution about the basic and schematic structure (coincidence of crystal axis of the crystal material and direction of tuning fork), the operating principle of angular velocity sensor is explained, and the subsequent description relates to the monitoring system, setting of resonance frequency relation of XD oscillation, XS oscillation, ZS oscillation, and ZD oscillation, and connection method of external supporting member, sequentially, including the means of solving the problems.

Figure 15:
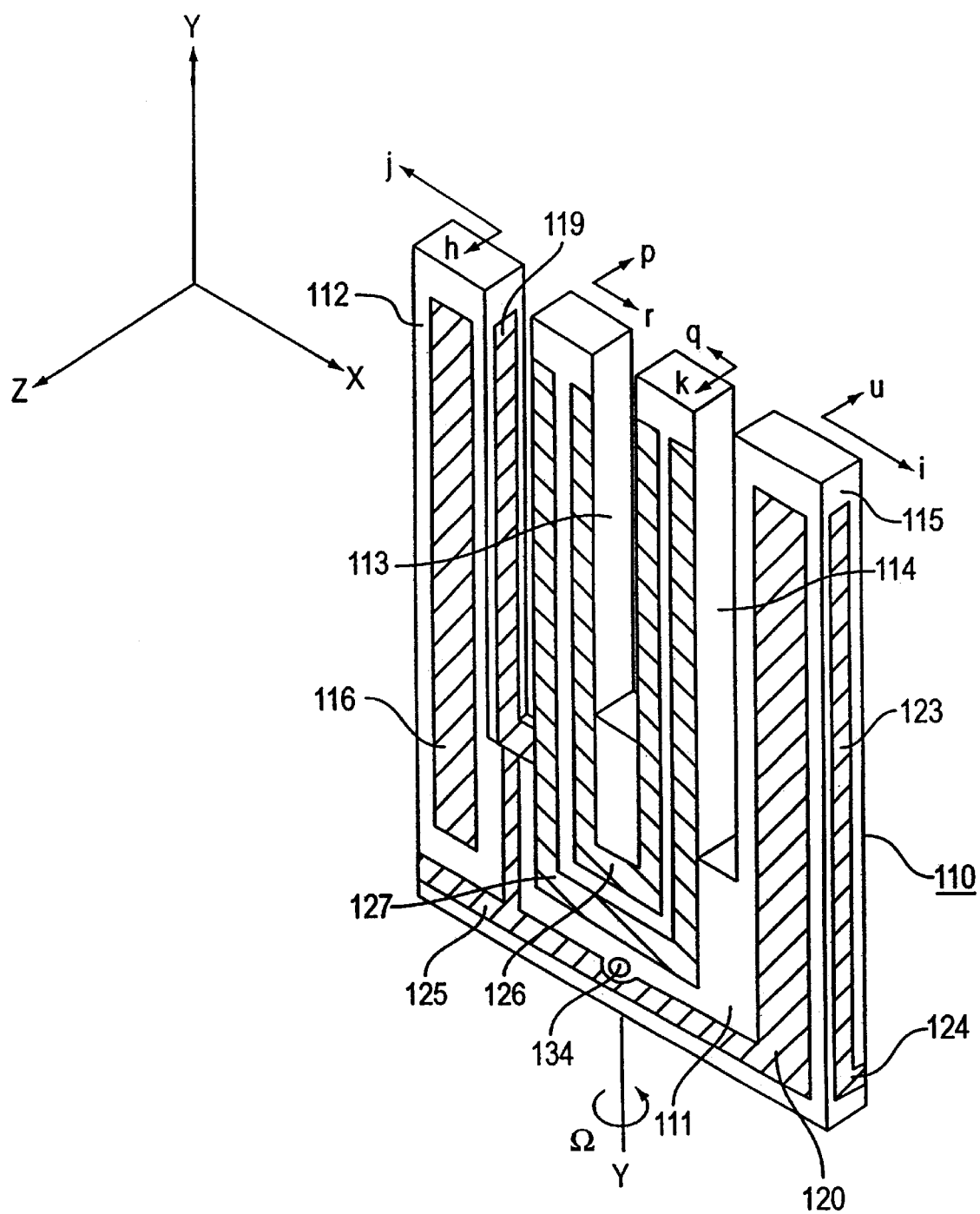
FIG. 15 is a perspective view showing an angular velocity sensor by comb shaped tuning fork using crystal in a different embodiment of the invention.

A schematic constitution of the embodiment is described while referring to FIG. 15 through FIG. 22. FIG. 15 shows the appearance of the embodiment of the comb shaped compound tuning fork, and this shape is intended to achieve the effective utilization of the crystal material in the volume of the oscillator as problem 6. In FIG. 15, reference numeral 110 is a compound tuning fork in a comb shape, in which the width direction of tuning fork (supposing X-direction) from the crystal material is the electric or extraordinary axis of the crystal material, and the longitudinal direction of compound tuning fork (supposing Y-direction) and thickness direction (supposing Z-direction) are respectively directions rotated by θ degrees about the electrical axis starting from the mechanical axis and optical axis of the crystal axis of the crystal material, and a common support member 111 is provided at the lower end, and four parallel oscillating arms 112, 113, 114, 115 are formed above the support member 111. The outer two oscillating arms 112, 115 of the oscillating arms 112 to 115 are used as the driving side tuning fork, and the inner two oscillating arms 113, 114 are used as the detecting side tuning fork. In the center of the support member 111 a hole 134 is provided for mounting of the comb shaped tuning fork 110 on an external supporting member.

Figure 16:
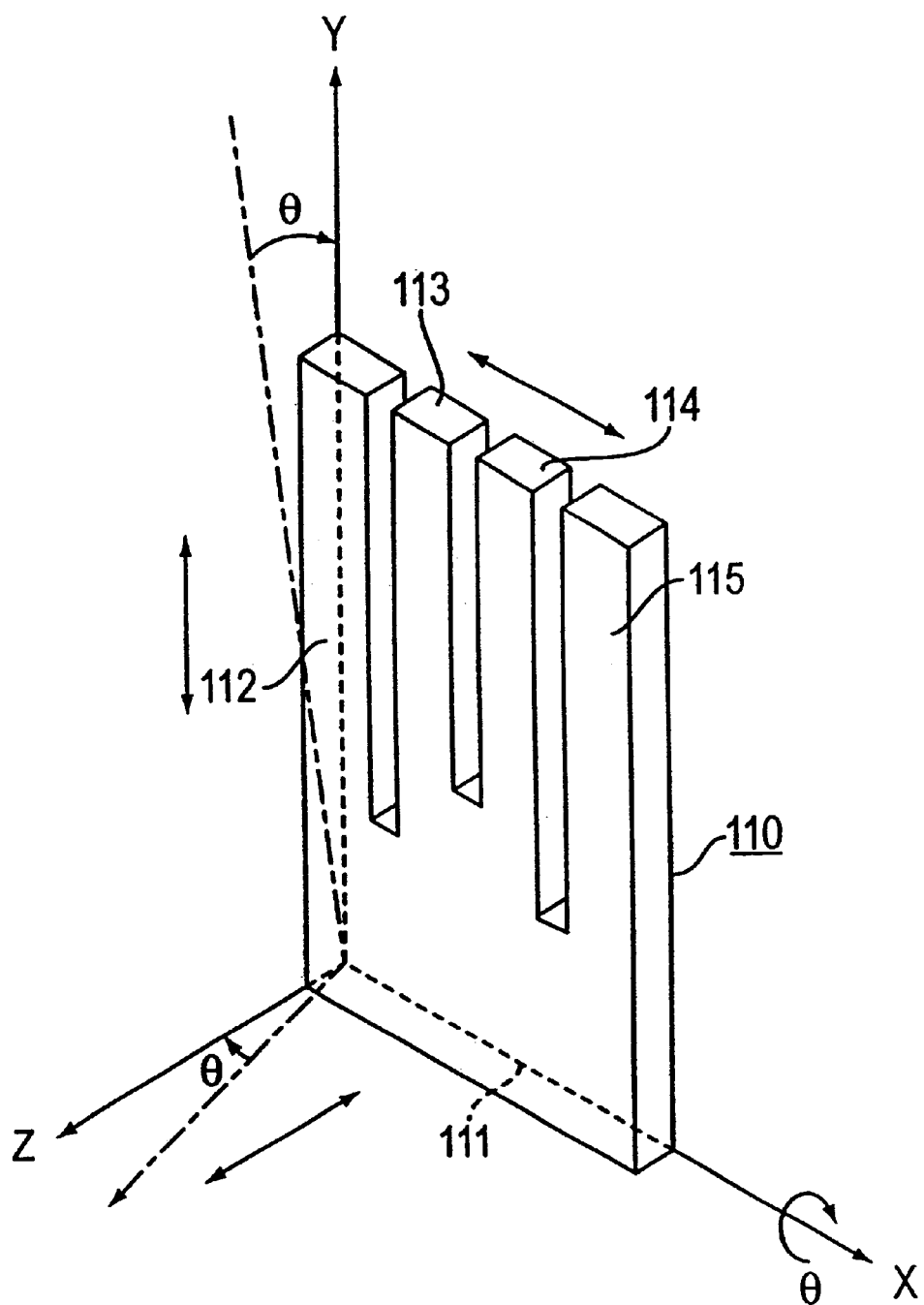
FIG. 16 is a diagram showing the tuning fork and direction of crystal axis of the same sensor.
Figure 17:
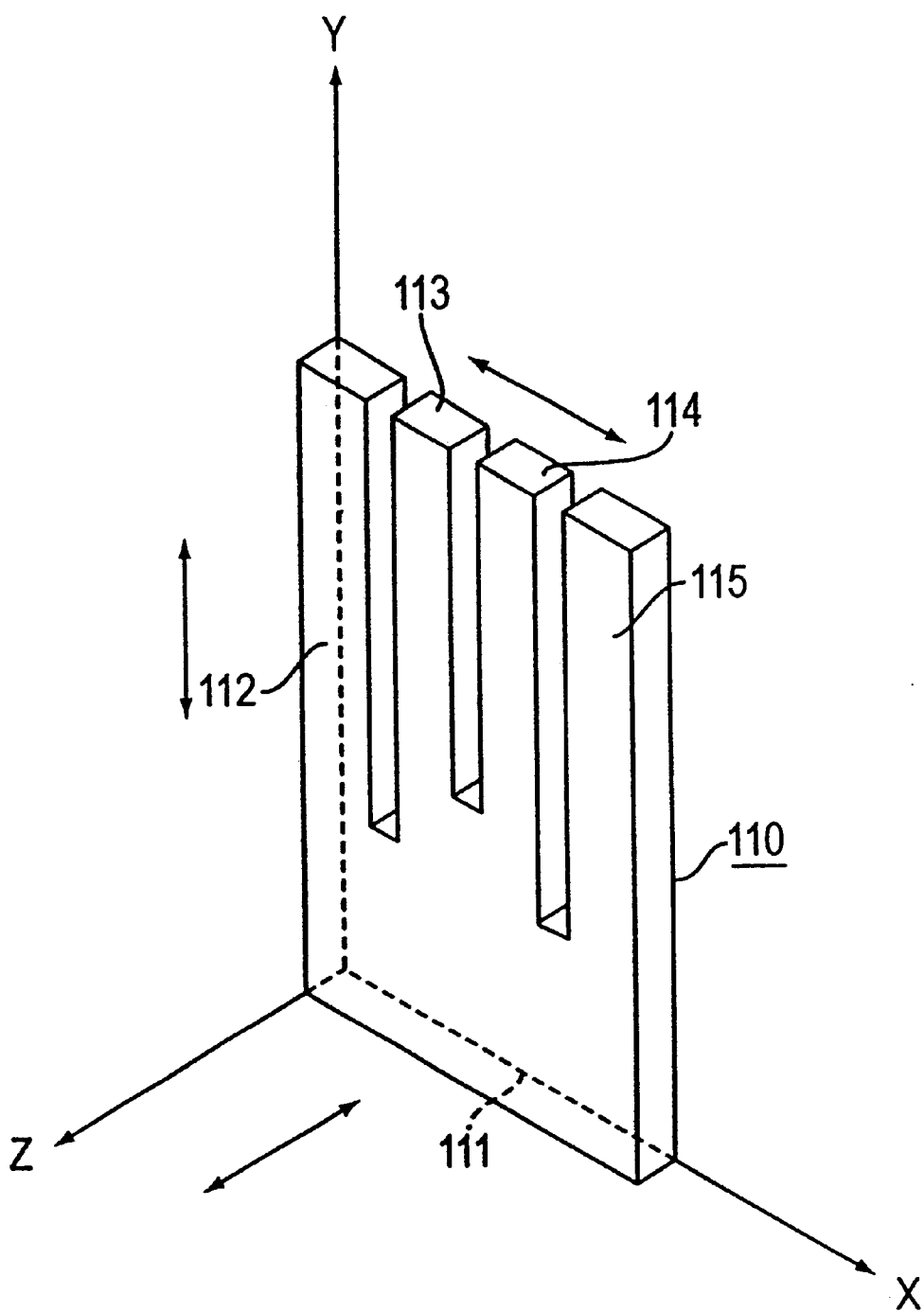
FIG. 17 is a diagram shoving the tuning fork and direction of crystal axis of the same sensor.

FIG. 16 and FIG. 17 show the direction of tuning fork and direction of material anisotropy of crystal, and in the comb shaped tuning fork 110 in FIG. 16, the width direction (X-direction) is matched with the electric axis of crystal axis of crystal material, and the tuning fork longitudinal direction (Y-direction) and tuning fork thickness direction (Z-direction) are designed to form an angle θ, not zero, with the mechanical axis and optical axis of the crystal axis of the crystal material. FIG. 17 shows an example of forming the comb shaped tuning fork 110 so that the directions X, Y, Z indicated by the shape of the tuning fork may respectively coincide with the electrical axis, mechanical axis, and optical axis of the crystal material (the angle θ may be zero), and selection of FIG. 16 or FIG. 17 is to solve the trade-off of high sensitivity, stability of sensitivity, and response of angular velocity as problem 1.

That is, the angle θ is set in order to stabilize the sensitivity through stabilization of temperature characteristic of the resonance frequency of crystal, and it is usually set within 1 to 2 degrees in the simple tuning fork used in clock or similar application. In the embodiment as angular velocity sensor, however, high sensitivity is required, but in the application such as vehicle navigation in which response is not relatively required, a certain value of θ is provided for setting precisely the resonance frequency of XD oscillation and ZS oscillation as mentioned later, whereas in the application for vehicle posture control relatively low in sensitivity although high response is required, on the other hand, precise setting of resonance frequency of oscillation in each direction is not needed, and hence θ is zero.

Figure 19:
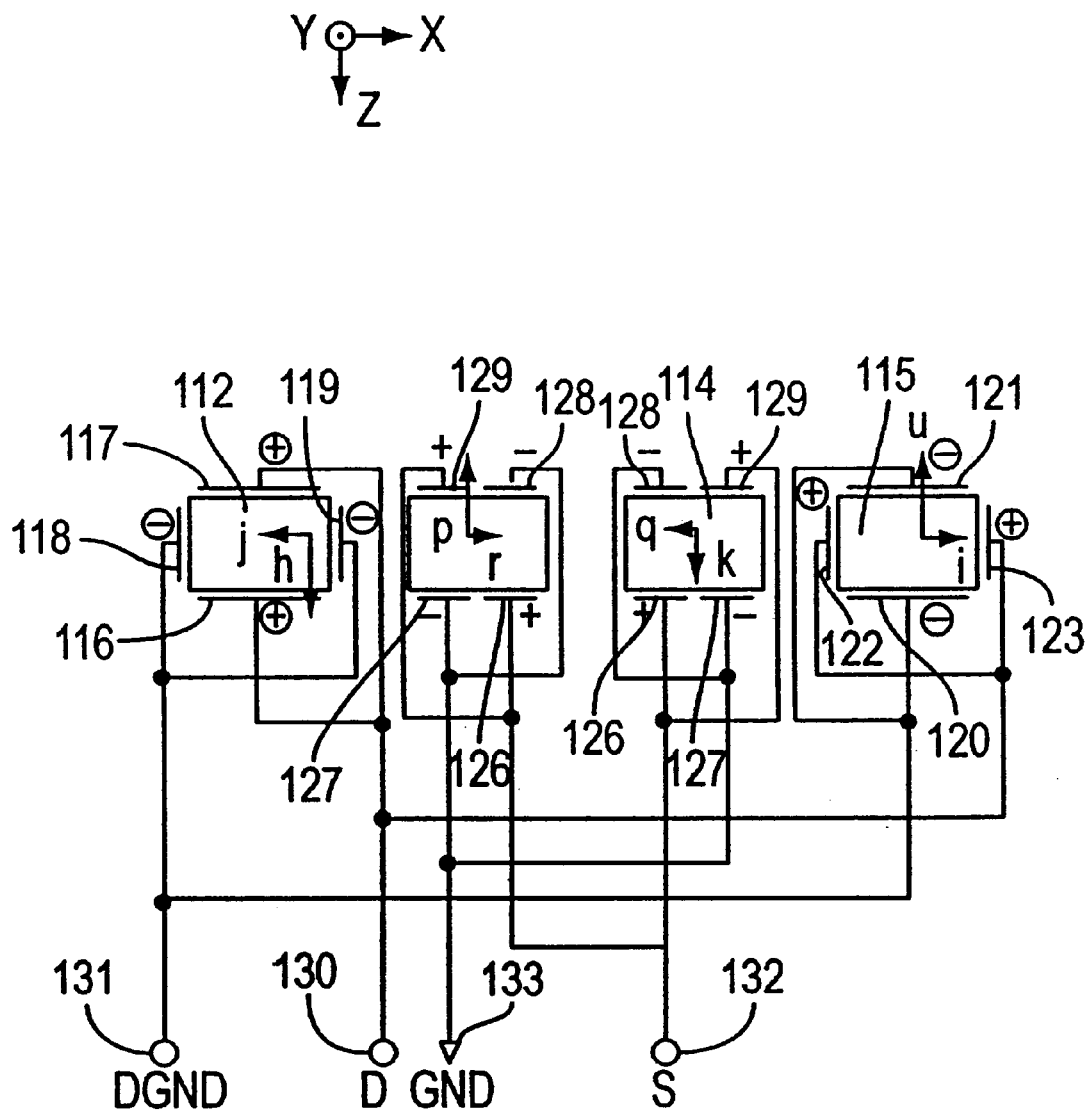
FIG. 19 is an electrode configuration and wiring diagram of the same sensor.
Figure 21:
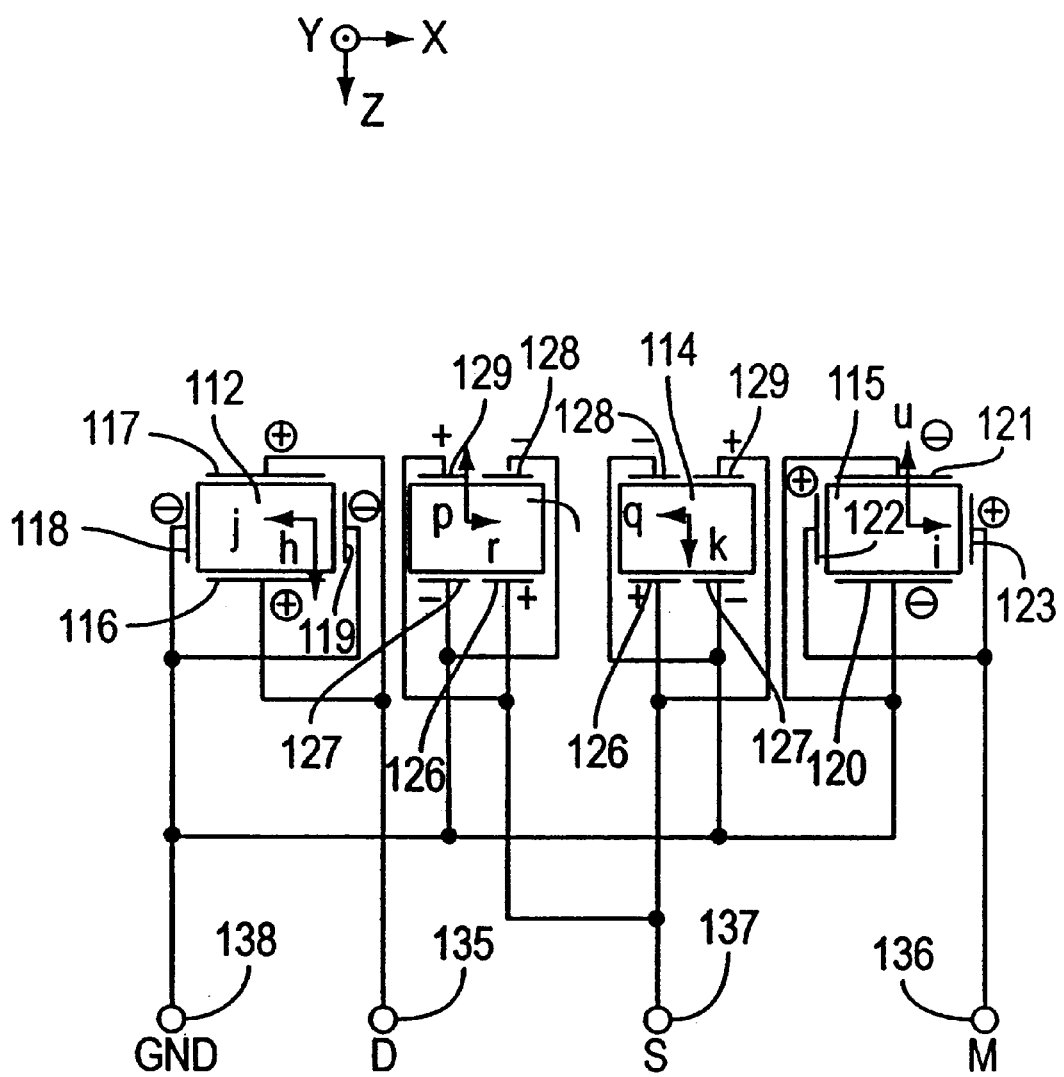
FIG. 21 is an electrode configuration and wiring diagram of the same sensor.

FIG. 19 and FIG. 21 show electrode and terminal structures same as in FIG. 15. FIG. 19 refers to the electrode and terminal structure of general method (hereinafter called non-monitor method), and FIG. 21 relates to the electrode and terminal structure of so-called monitor method.

Referring first to the common portions in FIG. 19 showing the non-monitor method and FIG. 21 showing the monitor method, on the face and back surfaces of one outer oscillating arm 112 and support member 111 of the driving side tuning fork, + side driving electrodes 116, 117 are formed, on both side surfaces, – (minus) side driving electrodes 118, 119 are formed, on face and back surfaces of other outer oscillating arm 115, – side driving electrodes 120, 121 are formed, and on both side surfaces, + side driving electrode 122, 123 are formed. On face and back surfaces of two oscillating arms 113, 114 and support member 111 of the inner detecting side tuning fork, + side detecting electrodes 126, 129 are formed at the face surface inside and back surface outside, and – side detecting electrodes 127, 128 at the face surface outside and back surface inside. Moreover, the + side and – side of the driving electrode, and + side and – side of the detecting electrode are respectively connected in conductive patterns 124, 125 for driving electrodes formed on the side surface and back surface of the support member 111, respectively, or in an upward pi-shaped conductive pattern as shown in the support member 111 in FIG. 15 in the case of detecting electrode, or, not shown in the embodiment, on an external circuit through conductive wire in the case of electrode that cannot be connected on the support member geometrically in phase as in the case of + side driving electrode 116 (in this respect, for the convenience of expression of take-out terminal, all are handled as being connected on the conductive pattern of the support member).

The terminal wiring differing between the monitor method and non-monitor method is described below. First, as the terminal structure in FIG. 19 of non-monitor method, + side driving electrodes 116, 117, 122, 123 are connected to a driving terminal (D) 130, – side driving electrodes 118, 119, 120, 121 to a driving reference terminal (DGND) 131, + side detecting terminals 126, 129 to a detecting terminal (S) 132, and – side detecting terminals 127, 128 to reference terminal (GND) 133.

As the terminal structure in FIG. 21 of monitor method, + side driving electrodes 116, 117 are connected to a driving terminal (D) 135, + side driving electrodes 122, 123 to a monitor terminal (M) 136, + side detecting terminal 126, 129 to a detecting terminal (S) 137, and – side driving electrodes 118, 119, 120, 121, and – side detecting electrodes 127, 128 to a reference terminal (GND) 133 (hereinafter the oscillating arms of the driving electrode 116, 117 side of the driving side tuning fork are called driving oscillating arms, and oscillating arms at driving electrode 122, 123 side are called monitor oscillating arms).

Figure 22:
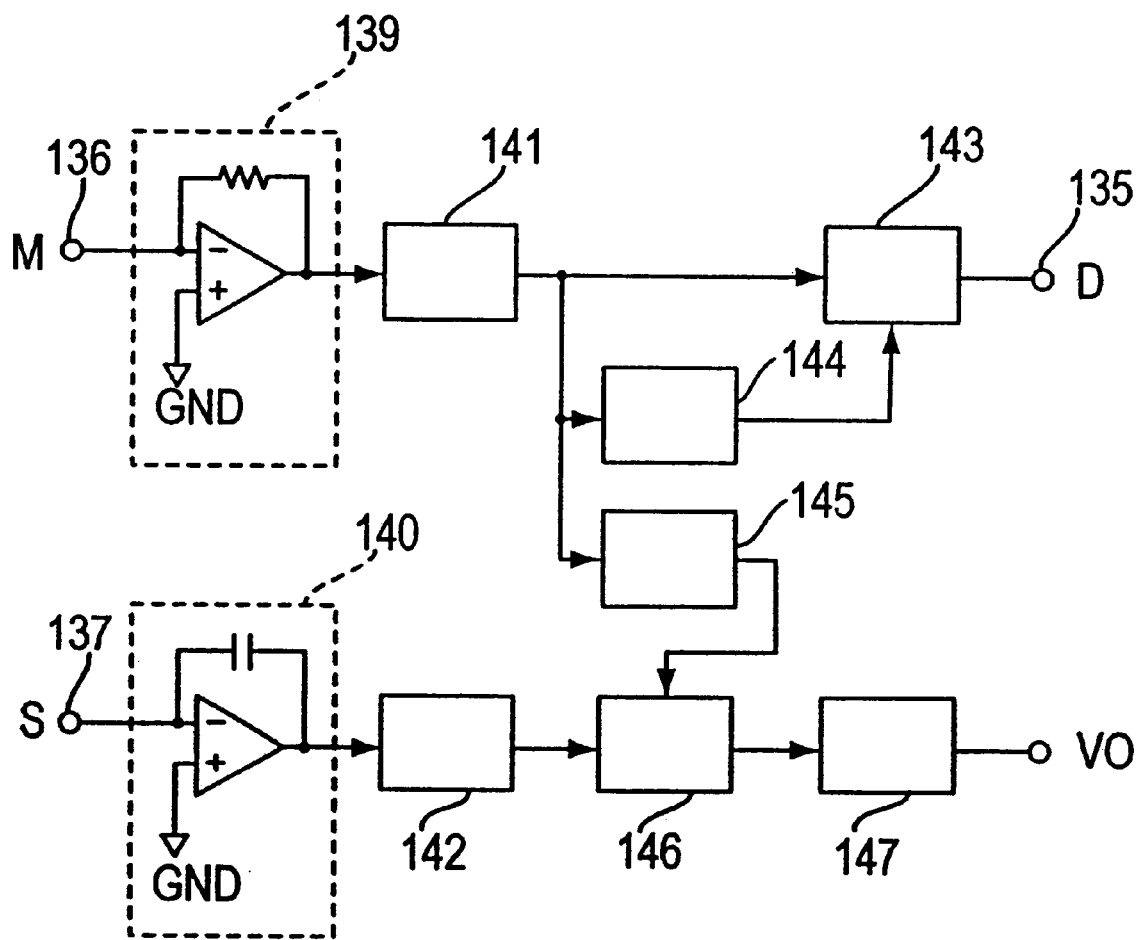
FIG. 22 is a circuit block diagram of the same sensor.
Figure 23A:
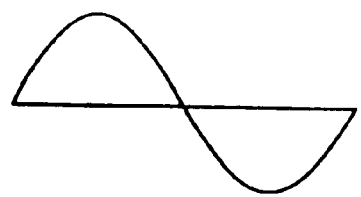
FIG. 23(a) to (f) are diagrams showing electric operation of the same sensor.
Figure 23B:
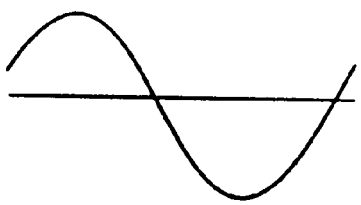
Figure 23C:
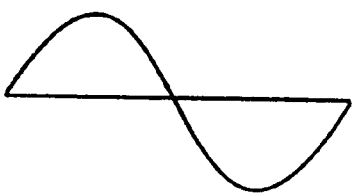
Figure 23D:
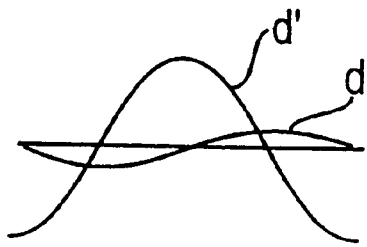
Figure 23E:
Figure 23F:
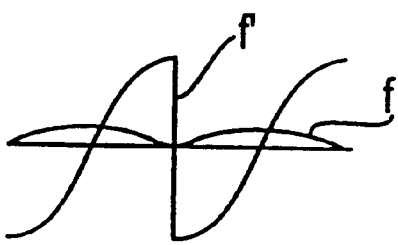

FIG. 22 is a circuit structural diagrams mainly explaining the monitor method, and describing the electrode and terminal structure by referring to FIG. 19, reference numeral 139 is a current amplifier for detecting the current by the electric charge generated in the + side driving electrodes 122, 123 (hereinafter called monitor current signal) directly at reference potential by imaginary shorting through the monitor terminal (M) 136, 140 is a charge amplifier for detecting the electric charge generated in the + side detecting electrodes 126, 129 (hereinafter called detecting charge signal) directly at reference potential by imaginary shorting through the detecting terminal (S) 137, 141, 142 are AC voltage amplifiers, 144 is an AC/DC converter, and 143 is a driving voltage controller for controlling the amplification factor of the output of the AC voltage amplifier 141 through negative feedback from the own output, depending on the output of the AC/DC converter 144, so as to keep constant the monitor current signal, and its output (hereinafter called driving voltage) is connected to the driving terminal (D) 135. Reference numeral 145 is a zero cross comparator for comparing the output of the AC voltage amplifier 141 with reference potential, and its output is a rectangular waveform in phase with the output of the AC voltage amplifier 141. Reference numeral 146 is an in-phase detector for converting only the signal of same frequency and same phase as the monitor current signal into DC, by rotating normally or reversely the output of the AC voltage amplifier 142 responsible for detecting charge signal on the basis of the timing of the polarity change by zero cross comparator 145, and 147 is an integral filter for finally outputting the DC component of the output of the in-phase detector 146. That is, the output of the zero cross comparator 145 is a timing signal of in-phase detection.

Describing the non-monitor method in FIG. 22 only in the points different from the monitor method by referring to FIG. 19, the current amplifier 139 has the driving reference terminal (DGND) 131 as its input terminal, and detects the current due to electric charge (hereinafter called driving current signal) occurring due to mechanical-electrical conversion in the – side driving electrodes 118, 119, 120, 121, and inverts the polarity of the output of the AC voltage amplifier 141 as compared with the monitor system. Therefore, the driving voltage controller functions to keep constant the driving current signal, and the in-phase detector 146 detects the detecting charge signal on the basis of the reference timing of driving current signal. In the driving terminal (D) 135 and driving reference terminal (DGND) 131, aside from the driving current, a current flowing in the electrostatic capacity (hereinafter called driving charge current) derived from the induction of crystal material existing between both terminals also flows. This electrostatic capacity also exists among the monitor terminal (M)

136, detecting terminal (S) 137, and reference terminal (GND) 133, but since they are connected to the reference terminal (GND) 133 by imaginary shorting, voltage is not generated, and there is no effect on the operation.

This is the basic constitution of the embodiment, and the operating principle of the angular velocity sensor of the embodiment is described below while referring to FIG. 15, FIG. 19, FIG. 20, and FIG. 23.

By applying the driving voltage which is the output of the driving voltage controller 143 of the circuit thus constituted, between the driving terminal (D) 135 and driving reference terminal (DGND) 131, or between the driving terminal (D) 135 and reference terminal (GND) 138, a +/−electric field is generated in the X-direction of the driving side tuning fork, and expansion stress in the Y-direction is generated due to piezoelectric characteristic of crystal, and an initial XD oscillation of the tuning fork is started. In proportion to the oscillation level, a driving current is generated from the driving reference terminal (DGND) 131, or a monitor current is generated from the monitor terminal (M) 136, and the electric signal is positively fed back to the driving voltage controller 143 through the current amplifier 139 and AC voltage amplifier 141 of the above circuit. The resonance point of the XD oscillation which is a tuning fork oscillation has a very large sharpness Q, and therefore the open loop characteristic of the positive feedback loop reaches the maximum where the gain becomes the resonance frequency of XD oscillation (hereinafter called $f_{Xd}$). As for the phase, on the other hand, with respect to the driving voltage at frequency $f_{Xd}$, the driving current is zero degree, and the monitor current is inverted 180 degrees, and at the circuit side, with respect to the driving reference terminal (DGND) 131 at frequency $f_{Xd}$, the driving terminal (D) 135 is zero degree, and the driving terminal (D) 135 is inverted 180 degrees with respect to the monitor terminal (M) 136, and therefore, in total, the phase is zero degree in both non-monitor method and monitor method. In this negative feedback loop, therefore, the oscillation condition is established at frequency $f_{Xd}$, and XD oscillation as electrical and mechanical coupling oscillation starts self-oscillation. As for XD oscillation level, the XD oscillation level signal of the AC/DC converter 144 is converted into DC signal, and negative feedback is applied to the driving voltage controller 143, so as to be driven stably at specified oscillation level.

Describing specifically the voltage and force conversion, and oscillation velocity and current conversion which are piezoelectric phenomena in the crystal tuning fork, as the ± electric field in the direction of electric axis (X) of crystal of the driving side oscillating arm at which the driving voltage is applied is converted to the ± stress in the direction of mechanical axis (Y), the oscillating arm is deflected in the X-direction, and the oscillation is excited and continued, including the other oscillating arm by tuning fork coupling or resonance coupling. When oscillation is induced, each oscillation are has an oscillation velocity in the X-direction, and internally has a ± strain velocity (time differentiation of strain) in the Y-direction. The strain in the Y-direction in the crystal generates polarization charge in the X-direction by strain-charge conversion, which brings about an electrode charge. That is, the conversion of oscillation velocity and current is effected, and the driving current and monitor current appear as its result.

On the oscillating arm on which driving voltage is applied, conversion of driving voltage and driving force, response of driving force and oscillation velocity, and conversion of oscillation velocity and driving current are performed, and on the monitor oscillating arm on which voltage is not applied, response of tuning force coupling force and oscillation velocity, and conversion of oscillation velocity and monitor current are performed through tuning fork coupling. In conversion, the phase is held. Besides, since the XD oscillation is a resonant state, the oscillation velocity response to the driving force and oscillation velocity to the tuning force coupling force are in phase. On the other hand, the oscillating arm mechanically coupled without resonance to the XD oscillation has a resonance frequency apart from $f_{Xd}$, and hence the oscillation velocity response with respect to the non-resonance coupling causes a phase shift of 90 degrees.

Herein, this DX oscillation (i, j) couples force by mechanical coupling of the support member 111, and exerts force to induce XS oscillation (q, r) in reverse phase to X-direction to the oscillating arms 113, 114, and a large XS oscillation can be induced depending on the resonance setting of the resonance frequency of XS oscillation. The diagram shows (i, j) and (q, r) in reverse phase, but depending on the phase relation of the root of the driving side oscillating arm and root of detecting side oscillating arm, the relation may be either in phase or reverse phase.

In this way, the oscillation levels of the XD oscillation and XS oscillation are kept constant by the method of controlling the driving current or monitor current signal by the driving voltage controller 143. This state is the driving excitation state of the sensor, and at least a specific XD oscillation is generated and maintained.

Herein, when a rotational angular velocity Ω enters the entire tuning fork from outside through the support, Coriolis force acts on the portion under XD oscillation (i, j) or XS oscillation (q, r). This is because Coriolis force Fc acts on the portion of mass m having velocity v according to the following formula.

$$Fc = 2 \cdot m \cdot v \times \Omega$$

where Fc, v, Ω are vectors, , denotes the scalar product, x is the vector product, and v is the velocity of ID oscillation or XS oscillation. The component of Coriolis force in the Z direction induces ZD oscillation (h, u) or ZS oscillation (p, k). In the case of non-resonance between the XS oscillation and XD oscillation, the ZD oscillation on the basis of the XD oscillation is coupled with ZS oscillation, and anyway ZS oscillation is induced. The phase of ZD oscillation and ZS oscillation is the phase of receiving the driving force of maximum Coriolis force when the velocity v of XD oscillation or XS oscillation is maximum, that is, when the displacement is zero.

Then the ZS oscillation is induced, a stress occurs in the Y-direction of the oscillating arms 113, 114 of the detecting side tuning fork, and dielectric polarization occurs in the X-direction, and move of charge occurs from the detecting side electrode 127 to 126, from 128 to 129, At this time, the direction (±) of the move corresponds to the direction of (p, k).

The canceling effect of translation acceleration is described below. The translation acceleration directly acts in phase with the detecting side oscillating arm, and hence the oscillation or displacement by translation acceleration is in phase. That is, the direction of (p, k) is same, or two generated electric charges cancel each other inside the detecting side electrodes 127 and 126, or 128 and 129 straddling over the oscillating arm, and hence will not appear at the detecting terminal (S) 132.

The moving charge on the basis of Corioli's force is immediately detected and canceled by the move of charge by the charge amplifier 140 between the driving terminal (D) 135 and the imaginary shorted detecting terminal (S) 137, and voltage is not generated in the detecting terminal (S) 137. The output of the charge amplifier 140 is amplified by the AC voltage amplifier 142, and only the component of same frequency and same phase as the monitor current signal (that is, angular velocity signal) is issued as DC signal by the in-phase detector 146, and is converted into a complete DC component by the integral filter 147 to be delivered finally.

Describing, herein, further about in-phase detection, in the charge amplifier 140, aside from the angular velocity signal, extra charge not canceled on the axis of the undesired ZS oscillation unnecessarily coupled with XD oscillation or XS oscillation (this is different from the phase of Corioli's force driving by 90 degrees because it is oscillated in the phase as the maximum coupling driving force at maximum XD oscillation amplitude), undesired charge on the basis of oscillation by incoming translation acceleration, EMC noise and others are generated even at the angular velocity input of zero All these undesired charges are different in frequency from the angular velocity signal, or deviated in phase by 90 degrees, and therefore they are detected and attenuated by the in-phase detector 146, but are not converted into DC signals. They are hence substantially attenuated by the integral filter 147 at the next stage, and do not appear in the final output.

The electrical waveforms of parts conforming to the above operating principle are described in FIG. 23. Diagram (a) is a driving voltage waveform on the driving terminal (D) 135 under self-oscillation by XD oscillation. Diagram (b) is a driving voltage waveform flowing on the driving terminal (D). The driving voltage is converted into a driving force of same phase by piezoelectric characteristic of crystal, and in the resonant XD oscillation state, the driving force is in a state of equilibrium in reverse phase to the, reaction due to viscosity resistance and friction resistance proportional to the oscillation speed of XD oscillation, and the inertial force and elastic force of the oscillating arm are balanced in reverse phase to each other in a phase different by 90 degrees. Therefore, according to the energy conversion principle of driving, the current component proportional in phase to the velocity of XD oscillation flows as driving current. On the other hand, the crystal has an electrostatic capacity between the driving terminal (D) 135 and reference terminal (GND) 138, and the charging current to this electrostatic capacity (hereinafter called driving charge current) flows 90 degrees ahead of the driving voltage. It is because the two components are superposed that the driving current waveform (b) is slightly ahead in phase of the driving voltage waveform (a). Diagram (c) shows a monitor current flowing in the monitor terminal (M) 136, and it is in phase with the driving current. The driving current and monitor current are expressed as + in the direction of flowing into the tuning fork.

The waveforms at detecting side are described. Diagram (d) is an angular velocity detecting charge waveform, and (d') is a charge waveform on the basis of the undesired ZS oscillation. The undesired ZS oscillation is based on the driving force, and the ZS oscillation by angular velocity is based on Corioli's force, so that the both are deviated in phase by 90 degrees, Since the electric charge is an integrated value of a current, the undesired ZS oscillation charge waveform (d') is delayed by 90 degrees from the driving voltage waveform (a) (in phase with driving force). In this case, incidentally, the angular velocity detecting charge waveform is smaller. The current amplifier 139 produces a voltage output as a superposed waveform of (d) and (d'), and this waveform enters the in-phase detector 146 directly in phase. On the other hand, according to the monitor current waveform (c), the timing signal waveform (e) of in-phase detection is issued from the zero cross comparator 145. Diagrams (f') and (f) express the output waveform of the in-phase detector corresponding to the undesired ZS oscillation charge waveform, (d') and angular velocity detecting charge waveform (d). Finally, (f') and (f) are integrated by the integral filter 147, and the resulting DC waveform is issued, and therefore (f') due to undesired ZS oscillation is almost completely attenuated, and the waveform level of (f) on the basis of angular velocity is issued as output.

In this embodiment, a specific constitution about angular velocity sensor, and its problems, solving methods and effects are described below, Relating first to the monitor method, together with non-monitor method, it is intended to select and solve the trade-off of higher sensitivity and lower voltage as problem 2, and trade-off of smaller size (higher sensitivity), offset and its temperature drift as problem 3, and individual features are described below.

The driving current signal in non-monitor method is a current accompanying the voltage applied between the driving terminal (D) 130 and driving reference terminal (DGND) 131, and therefore aside from the pure driving current corresponding to the resonance oscillation velocity of XD oscillation of crystal, a driving charge current different in phase flowing in the electrostatic capacity as a dielectric element of crystal is also added, and when this electrostatic capacity has a temperature characteristic, it becomes a cause of disturbance for a constant control system of driving current signal, and the sensitivity becomes unstable, and it also becomes a disturbance factor for reference timing of in-phase detector, thereby worsening the offset and its temperature drift. Since, however, the driving energy is supplied from both oscillating arms of the driving side tuning fork, the voltage efficiency of driving with respect to sensitivity is high. That is, although the non-monitor system is poor in precision, it is preferably used in the application where low voltage specification is required.

By contrast, in the monitor method, since the monitor terminal (M) 136 is imaginary shorted to the reference potential by the current amplifier 139, driving charge current accompanying electrostatic capacity of dielectric element of crystal does not flow in the monitor terminal (M), As a result, only the monitor current perfectly proportional to the velocity of the monitor side oscillating arm of resonance XD oscillation of tuning fork is generated in the monitor terminal. Therefore, unlike the non-monitor method, it is free from disturbance caused by current flowing in the electrostatic capacity. The monitor method is low in voltage efficiency of driving with respect to sensitivity, and it is preferably used in the application of less strict voltage specification and high sensitivity.

Figure 18:
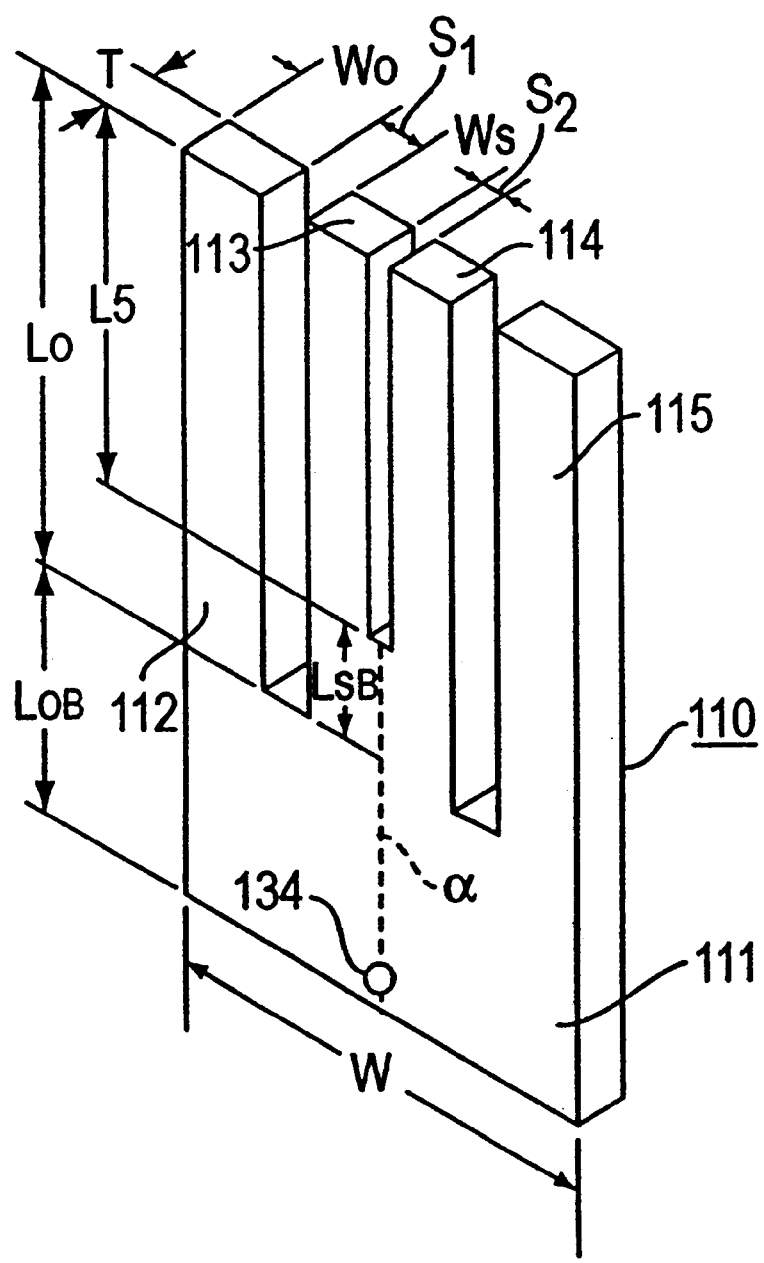
FIG. 18 is a dimension setting diagram of the same sensor.

Concerning trade-off of higher sensitivity and angular velocity response as problem 1, a case of selecting and solving commonly is described below, FIG. 18 shows dimensions of the embodiment in the comb shape formed from crystal by blade saw, sand blasting, other mechanical processing, or photolithography or other etching technique, and the dimensions are, for example, set as follows.

Length of oscillating arms 12, 15 of driving side tuning fork . . . $L_d$=11.00 mm Width of oscillating arms 12, 15 of driving side tuning fork . . . $W_d$=1.00 mm Length of oscillating arms 13, 14 of detecting side tuning . . . $L_S$=9.98 mm Width of oscillating arms 13, 14 of detecting side tuning ... $W_S$=0.80 mm Thickness of comb shaped tuning fork T=0.70 mm Width of entire comb shaped tuning fork W=5.00 mm Length of support of driving side tuning fork ... $L_{db}$=4.00 mm Length of support of detecting side tuning fork ... $L_{Sb}$=1.02 mm Slit interval of oscillating arms of driving side and detecting side ... $S_1$=0.50 mm Slit interval of oscillating arms 13, 14 of detecting side tuning fork ... $S_2$=0.40 mm The above setting of dimensions is dimensions belonging to the angular velocity sensor intended to be almost same in the resonance frequency $f_{Xd}$ of XD oscillation and resonance frequency $f_{XS}$ of XS oscillation, and different in resonance frequency $f_{ZS}$ of ZS oscillation, and it is designed to be $f_{Xd}$=$f_{XS}$=6635 Hz, and $f_{ZS}$=5251 Hz, Actually, due to limitation of processing precision. conditionally, the detuning $f_Xd$-$f_{XS}$ of $f_Xd$ and $f_{XS}$ is adjusted to be 1 Hz or less by trimming. This is intended to bring about the maximum Corioli's force to the detecting side tuning fork at the time of input of angular velocity by giving a sufficient X-direction reverse phase oscillation (XS oscillation) to the detecting side tuning fork by perfect resonance of XS oscillation with respect to XD oscillation in self-excited resonance state.

In this dimension setting, the frequency of Corioli's force in reverse phase in the Z-direction of the detecting side tuning fork is the self-oscillation frequency $f_X$d of XD oscillation, and in this case the detuning $f_{ZS}$-$f_{Xd}$=-1384 Hz of $f_{ZS}$ and $f_X$d is large, and therefore the Z-direction reverse phase oscillation (ZS oscillation) of the detecting side tuning fork as the reaction of Corioli's force is largely apart from the resonance with the XD oscillation, and as a result this is the dimension setting responding to the input angular velocity at high speed. The sensitivity is, however, smaller than in the case of dimension setting of $W_d$=0.78 mm mentioned below. This is a preferred setting for posture control of vehicle or the like where high speed response because the angular velocity input range is relatively large.

Incidentally, by changing only the width of oscillating arms 112, 115 of the driving side tuning fork to $W_d$=0.78 mm, it results in $f_{Xd}$=5275 Hz, and the dimension setting relates to dimensions belonging to the angular velocity sensor intended to be nearly same in the resonance frequency $f_{Xd}$ of XD oscillation and resonance frequency $f_{XS}$ of XS oscillation, and also nearly same in the resonance frequency $f_{ZS}$ of ZS oscillation, and in addition to the trimming under the dimension setting above, conditionally, the detuning $f_{Xd}$-$f_{ZS}$ of $f_{Xd}$ and $f_{ZS}$ is adjusted to 24 Hz±1 Hz by trimming.

Not only by bringing about the maximum Corioli's force to the detecting side tuning fork by resonance of XD oscillation and XS oscillation as in the dimension setting above, but also by bringing the ZS oscillation closer to resonance (to be near-resonance) as the reaction, the dimension setting has a high sensitivity for input angular velocity. However, the response speed is smaller than in the above dimension setting of $W_d$=1.00 mm. This is a preferred setting for navigation system for vehicle or the like small in angular velocity input range and usable at relatively low response speed.

The trimming may be done by any known method, such as oblique cutting of the corner of leading end of oscillating arms 112 to 115, V-groove cutting of the root of oscillating arms 112 to 115, cutting of bottom of the support member 111, and adhesion and adding of small mass to the leading end.

Meanwhile, by changing the width $W_S$ of the detecting side tuning force while remaining at $W_d$=0.78 mm, $f_{XS}$ varies, and therefore an angular velocity sensor same in $f_{Xd}$ and $f_{ZS}$ and different in $f_{XS}$ can be composed. This is not only to solve problem 1 by setting any one of the above, but also to achieve the smaller size, and improvement of offset and its temperature drift as problem 3. In this constitution, the XS oscillation of the detecting side tuning fork does not resonate with the XD oscillation of the driving side tuning fork, and the driving side tuning fork exclusively receives the Coriolis force in reverse phase in the Z-direction when the angular velocity is entered. This Corioli's force is mechanically coupled with the detecting side tuning fork through the support member of the tuning fork at the frequency of resonant XD oscillation, and the ZS oscillation of the detecting side tuning fork is large because the resonance frequency is close to the resonance frequency of XD oscillation, and thereby it functions as the angular velocity sensor. It is a feature of this constitution that the XS oscillation is not resonant to the XD oscillation, so that the undesired mechanical coupling from XD oscillation to ZS oscillation does not occur, and therefore undesired ZS oscillation components are nearly eliminated, which may lead to improvement of offset and its temperature drift.

In the above dimension setting, by changing the thickness T of the tuning fork, and varying the length $L_S$ of the oscillating arm at the detecting side tuning fork to cancel the resulting change of $f_{ZS}$ so as to be equal between $f_{Xd}$ and $f_{ZS}$, and by further dimension setting to equalize $f_{Zd}$ and $f_{Xd}$ while $f_{XS}$ is different, an angular velocity sensor can be composed, and this constitution can select and solve problem 1 and solve problem 3, same as in the above case. It is a feature of the composition that not only the offset and its temperature drift are improve, but also the high sensitivity characteristic is also achieved, by resonating the ZX oscillation of the driving side tuning fork by the Coriolis force appearing in the driving side tuning fork, and further by resonating the ZS oscillation of the detecting side tuning fork.

The above resonance setting of resonance frequency is also possible in two simple tuning forks only in XD oscillation and ZS oscillation, but when the driving electrode and detecting electrode are disposed on the oscillating arms closely to each other, the driving voltage carries the electric charge to the detecting electrode through the electrostatic capacity of crystal, and it becomes in phase with the angular velocity signal and it cannot be separated by the in-phase detector 146, so that it may cause offset and its temperature drift. On the other hand, when the driving electrode and detecting electrode are disposed separately on the right and left oscillating arms, the canceling effect of translation acceleration is eliminated, and a large translation acceleration charge appears on the detecting terminal (S) 132, and it is left over as DC voltage even after detection and attenuation by the in-phase detector.

The following description is intended to solve the three problems, that is, undesired sensitivity for external translation acceleration as problem 4, realization of low offset and its temperature drift as problem 5, and alleviation of external impact as problem 6.

Figure 20:
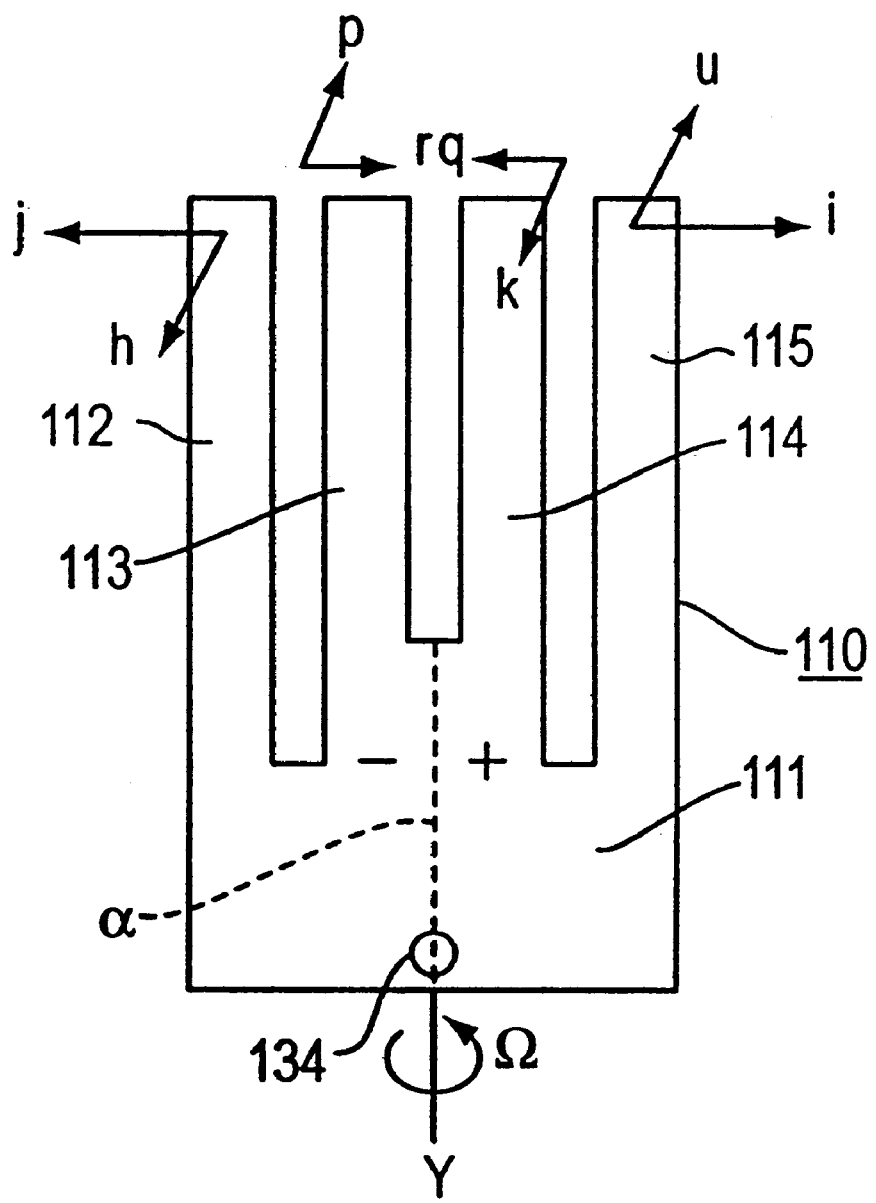
FIG. 20 is a diagram showing mechanical action of the same sensor.

The small hole 134 is, as shown in FIG. 20, is a hole structure for similar symmetrical connection with external supporting member on the basis of the center line for symmetrical compound tuning forks within the XY plane, in which leak of oscillation to outside is attenuated by disposing on the balance nodal points in the X-direction of tuning fork of XD oscillation and XS oscillation, thereby reducing the offset and offset temperature drift, and when the ZS oscillation (Z-direction oscillation in reverse phase of detecting side tuning fork) and ZD oscillation (Z-direction oscillation in reverse phase of driving side tuning fork) as response of Corioli's force are in phase, that is, when the rotational oscillation about the Y-axis (this is called Y rotational oscillation) is induced, mechanical impedance of Y rotational oscillation is stabilized and set, or in the case of reverse phase (at this time, Y rotational oscillation is canceled), leak of oscillation to outside is attenuated as the configuration on the balance nodal points of both oscillation Y rotations, thereby reducing the offset and offset temperature drift.

Incidentally, whether the ZS oscillation and ZD oscillation are in phase (the state of inducing Y rotational oscillation) or out of phase (the state of canceling Y rotational oscillation) depends on the configuration of inside roots of inside and outside oscillating arms (corresponding to driving side and detecting side) to the support member in the Y-direction, and when the inside root position of the inside tuning fork is at the leading end side of the tuning fork, Y rotational oscillation is induced, and when at the support member side, Y rotational oscillation is canceled.

That is, the sensitivity is brought about by the ZS oscillation, but it is the structural impedance of the detecting side oscillating arms and support member 111 that determines it basically. However, the degree of freedom of design is enhanced because the structural impedance of the connection support member with outside can be either connected or not connected as described below, when the resonance frequency $f_{ZS}$ of ZS oscillation is different from the resonance frequency $f_{Xd}$ of ZD oscillation, the ZS oscillation level is relatively small, and the ZS oscillation and ZD oscillation are designed in the root configuration for inducing Y rotational oscillation to apply an angular moment to the entire tuning fork, so that the flexible level of the oscillating arm in ZS oscillation can be determined by the mechanical impedance by the external supporting member connected to the hole 134. In other words, when the external support is stiff, the flexible oscillation is concentrated on the oscillating arm, and a high sensitivity design is achieved, or when soft, the flexible oscillation is concentrated on the external supporting member, and a low sensitivity design is achieved. The low sensitivity design is relatively wide in the input range of angular velocity, and is an ideal design for posture control of vehicle or the like where high speed response is required.

Then the resonance frequency $f_{ZS}$ of ZS oscillation is same as the resonance frequency $f_{Xd}$ of ZD oscillation, the ZS oscillation level is large, and the resonance frequency $f_{Zd}$ of ZD oscillation is also same, and the ZS oscillation and ZD oscillation are designed in the configuration for canceling the Y rotational oscillation, and the angular moments of both oscillations cancel each other. This is an ideal design for navigation of vehicle or the like in which the angular velocity input range is narrow and it is usable at a relatively low response speed.

That is, the ZS oscillation is basically coupled through the support member 111 of the oscillating arms on the tuning fork, and therefore no design restrictions are given to the external supporting member for keeping sensitivity, and the degree of freedom of design can be sufficiently maintained for alleviating impact and lowering sensitivity to external translation angular velocity, and hence the design of attenuation of internal oscillation reflection for stabilization of offset is easy in both XD oscillation and ZS oscillation.

As in the case of the hole 134 in the embodiment, when the external supporting member is disposed on the center line symmetrical in the Y-direction, the Y-direction rotation deflection to the external translation acceleration is less likely to be induced, and the reducing effect of the external translation acceleration sensitivity is further enhanced.

To achieve the above design object, the external support connection number may be, aside from the hole 134, a protruding structure or a flat connecting structure as far as the structure is symmetrical about the center line symmetrical on the compound tuning fork within the XY plane.

Finally, for reference, a design method of resonance frequency is described below by referring to FIG. 18.

The oscillating arms 112 to 115 of the comb shaped tuning fork 110 shown in FIG. 18 can be handled as cantilevers from the theory of electric and acoustic oscillation engineering, and supposing the effective length of the oscillating arms 112, 115 to be $H_d$, longer than $L_d$, the resonance frequency $f_{Xd}$ of ID oscillation may be expressed as in formula 1.

$$f_{Xd} = \frac{\alpha^2}{2\pi\sqrt{12}} \cdot \frac{A \cdot X_d}{H_d^2} \sqrt{E_X/\rho} \tag{1}$$

where α=1.875 (frequency normal constant)

$E_X$: Young's modulus of crystal material in X-axis direction

ρ: density of crystal material

A: factor determined by length $L_{DS}$ of support member and interval dimensions $S_1$, $S_2$ of oscillating arms of tuning fork The resonance frequency $f_{XS}$ of XS oscillation of detecting side tuning fork induced by XD oscillation is, supposing the effective length of detecting side oscillating arms 113, 114 to be $H_S$, expressed similarly in formula 2.

$$f_{XS} = \frac{\alpha^2}{2\pi\sqrt{12}} \cdot \frac{B \cdot X_S}{H_S^2} \sqrt{E_X/\rho} \tag{2}$$

where B: factor determined by length $L_{SB}$ of support member of tuning fork, and interval dimensions $S_1$, $S_2$ of oscillating arms, a value very close to A The design condition of mechanical coupling of the tuning fork support member for inducing XS oscillation is formula 1=formula 2, and hence it is known to be required to design so as to satisfy formula 3.

$$\frac{A \cdot X_d}{H_D^2} = \frac{B \cdot X_S}{H_S^2}, \quad \text{that is,} \quad \frac{AX_d}{BX_S} = \frac{H_d^2}{H_S^2} \tag{3}$$

Incidentally, by selection of three resonance frequencies, depending on the design of $W_d$, $W_S$, and $L_d$, the relation of $L_S \geq L_d$ is also possible.

Next, as for the resonance frequency $f_{ZS}$ of ZS oscillation, since it is experimentally known that the effective length of oscillating arms in ZS oscillation is longer than $H_S$, supposing it to be $H_Z$, it may be expressed in formula 4, and if the tuning fork design of resonance type is the condition, it is enough by satisfying formula 2=formula 4, or formula 1=formula 4.

$$f_{ZS} = \frac{\alpha^2}{2\pi\sqrt{12}} \cdot \frac{T}{H_Z^2} \sqrt{E_Z/\rho} \qquad (4)$$

where $E_z$: Young's modulus of crystal material in the Z-axis direction

That is, formula 5 or formula 6 is obtained.

$$T/(BW_S) = (H_Z/H_S)^2 \sqrt{E_X}/\sqrt{E_Z} \qquad (5)$$

$$T/(AW_d) = (H_Z/H_d)^2 \sqrt{E_X}/\sqrt{E_Z} \qquad (6)$$

Hence, the ratio of thickness T and widths $W_S$, $W_d$ of the detecting side tuning fork oscillating arms may be determined from the effective lengths $(H_{Z/Hs})^2$ and $(H_Z/H_d)^2$ of oscillating arms 113, 114 by measuring their Young moduli $E_Z$, $E_X$. In this embodiment, since $\theta = 3°$, it was calculated by using the known constants before rotation to obtain guideline.

In the design condition satisfying both formula 3 and formula 5, that is, by equalizing the three frequencies $f_{Xd}$, $f_{XS}$, and $f_{ZS}$, a high sensitivity is expected, but it takes much time and labor in adjustment of frequency in manufacture, and the cost is raised, and therefore the case of $f_{Xd} = f_{XS} \neq f_{ZS}$ and $f_{ZS} = f_{Xd} \neq f_{XS}$ is preferred. The Q value of resonance of crystal material is high, over 10,000, and it is often difficult to manufacture at $f_{Xd} = f_{XS}$, and therefore by making use of degeneracy phenomenon, it may approximately set at $f_{Xd} \neq f_{XS}$.

For reference, in designing of this tuning fork in a tandem shape, supposing the outside oscillation arms 151, 152 to be semi-fixed both ends, and the first eigenvalue to be $\beta$, the resonance frequency $f_{Xd}$ of XD oscillation corresponding to formula 1 becomes as shown in formula 7, and considering also that the length is two times longer, $f_{Xd}$ is about 1.59 times $([\beta/\alpha]^2 \div 4)$ as compared with the case of comb shaped tuning fork, and $W_d$ may be decreased for the corresponding portion.

$$f_{Xd} = \frac{\beta^2}{2\pi\sqrt{12}} \cdot \frac{A \cdot X_d}{H_d^2} \sqrt{E_X/\rho} \qquad (7)$$

where $\beta = 4.7300$ (frequency normal constant)

Third Embodiment

Using a tuning fork in a tandem shape, an embodiment of non-monitor type driving detection method is described below. The difference of the tandem shape from the comb shape lies in the complicated structure and high sensitivity. The operating principle, detail of constitution, problems, solving means, and effects are basically same as in the foregoing embodiments and are hence omitted.

A schematic constitution of the embodiment is described while referring to FIG. 24 to FIG. 31, FIG. 24 is the appearance of the embodiment of the tandem shaped compound tuning fork, in which reference numeral 148 is a compound tuning fork formed in a tandem shape, made from a crystal material with the width direction of tuning fork (supposing X-direction) set on the electric axis of crystal axis of crystal material, and longitudinal direction (supposing Y-direction) and thickness direction (supposing Z-direction) of compound tuning fork respectively rotated by $\theta$ degrees around the electrical axis from the mechanical axis and optical axis of the crystal axis of crystal material, and common support members 149, 150 are provided on the upper and lower ends, driving side oscillating arms 151, 152 are provided at both sides so as to link the support members 149, 150, and two detecting side oscillating arms each 153, 154, and 155, 156 are provided inside at the support members 149, 150. In the middle of the support members 149, 150, tiny holes 157, 158 are formed for mounting of the tandem shaped tuning fork 148 on the external supporting member.

In this constitution, the two oscillating arms 151, 152 are used as the driving side tuning fork, and four oscillating arms 153 to 156 are used as detecting side tuning fork, and consequently two comb shaped tuning forks are combined end to end, and the driving side tuning fork is an integral structure isolated from the detecting side tuning fork, so that the output sensitivity is twice as large.

Figure 24:
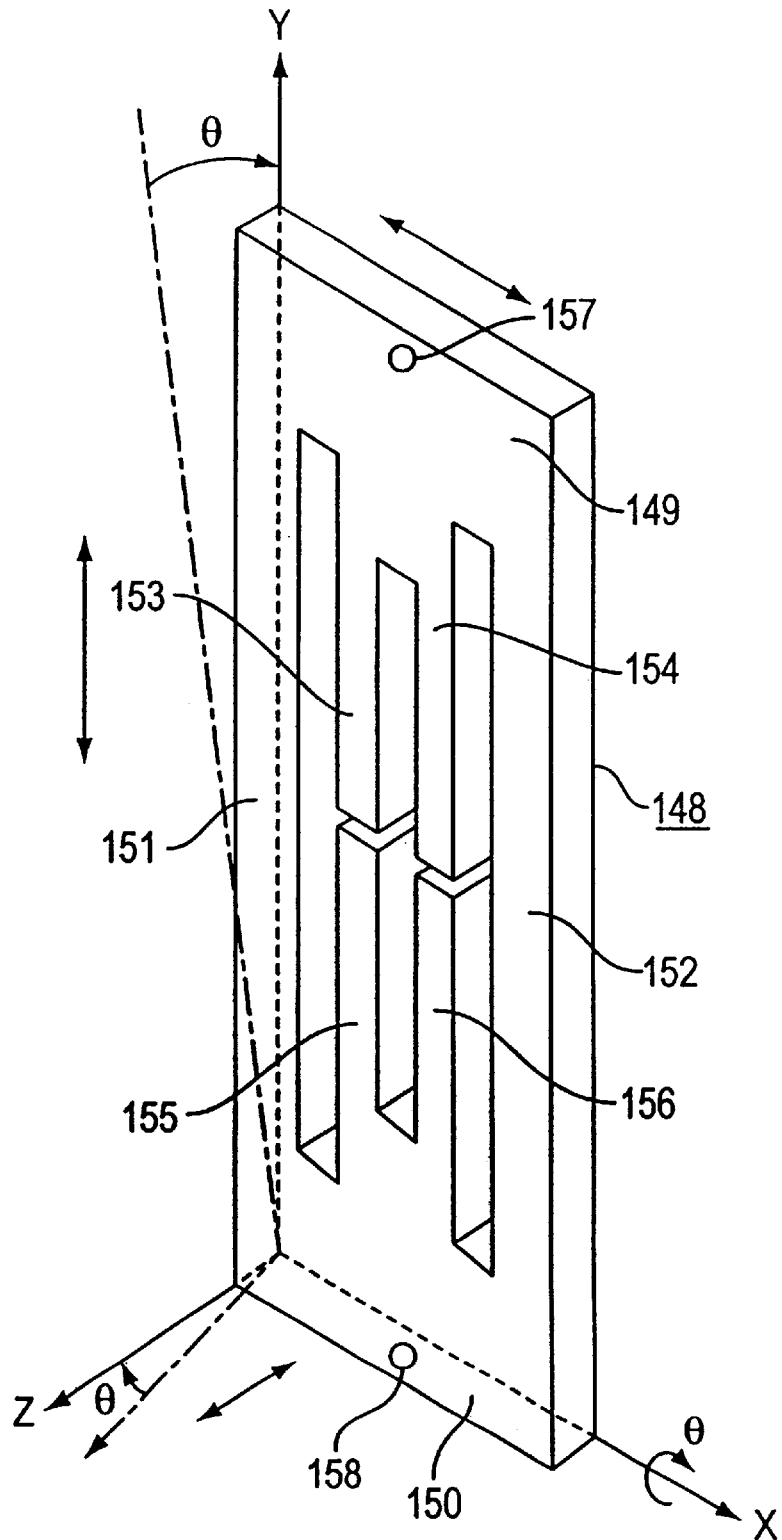
FIG. 24 is a perspective view showing an angular velocity sensor by a tandem shaped tuning fork using crystal in a further different embodiment of the invention.
Figure 25:
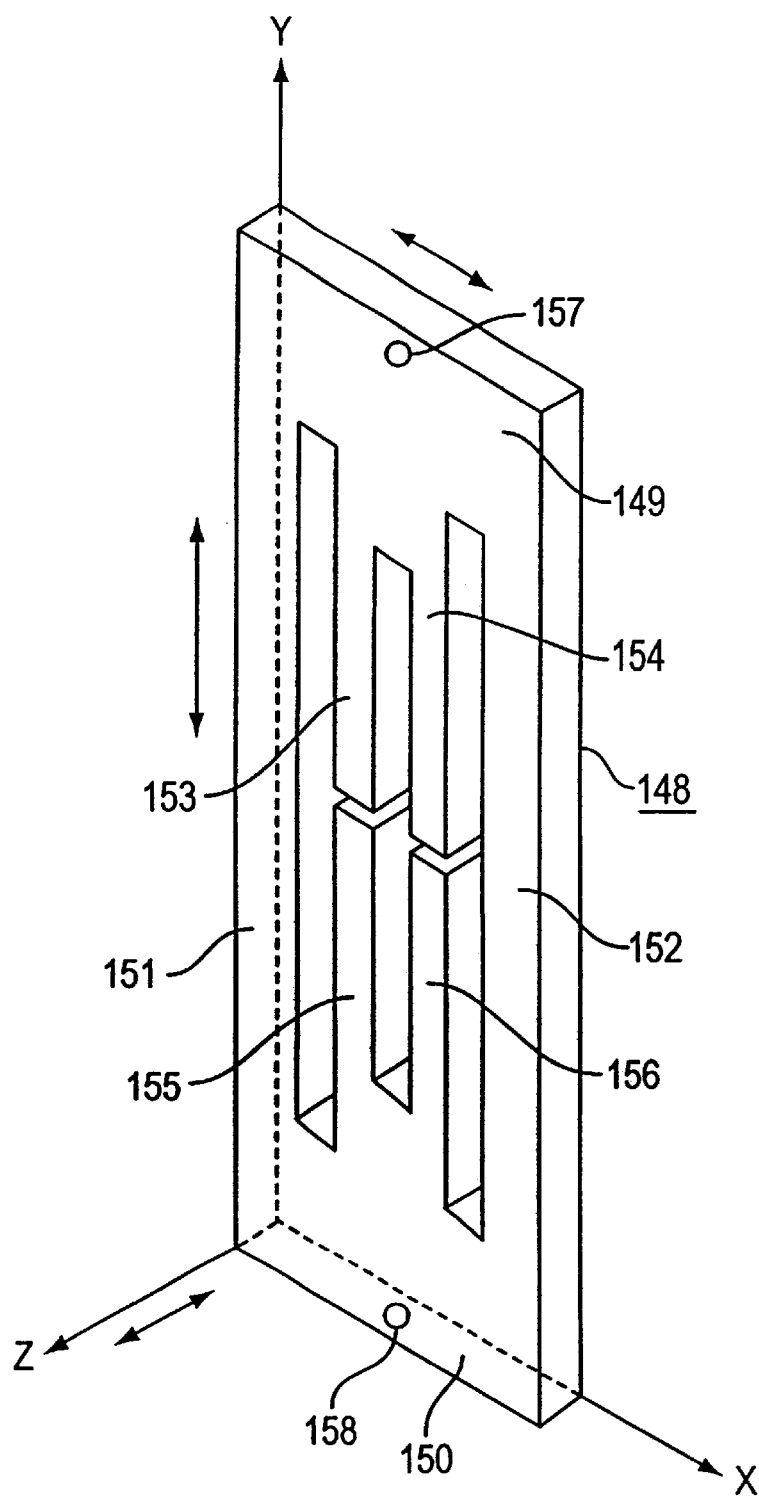
FIG. 25 is a diagram showing the tuning fork and direction of crystal axis of the same sensor.

FIG. 25 shows the direction of tuning fork and direction of material anisotropy of crystal in contrast to FIG. 24, and in the tandem shaped tuning fork 148 in FIG. 24, the width direction (X-direction) coincides with the electric axis of crystal axis of crystal material, and the longitudinal direction (Y-direction) of tuning fork and thickness direction (Z-direction) of turning fork are set to form an angle $\theta$, not zero, with the mechanical axis and optical axis of the crystal axis of crystal material, whereas the angle $\theta$ is zero in FIG. 25. These are intended to select and solve the trade-off of higher sensitivity, sensitivity stability, and response of angular velocity as problem 1.

Figure 31:
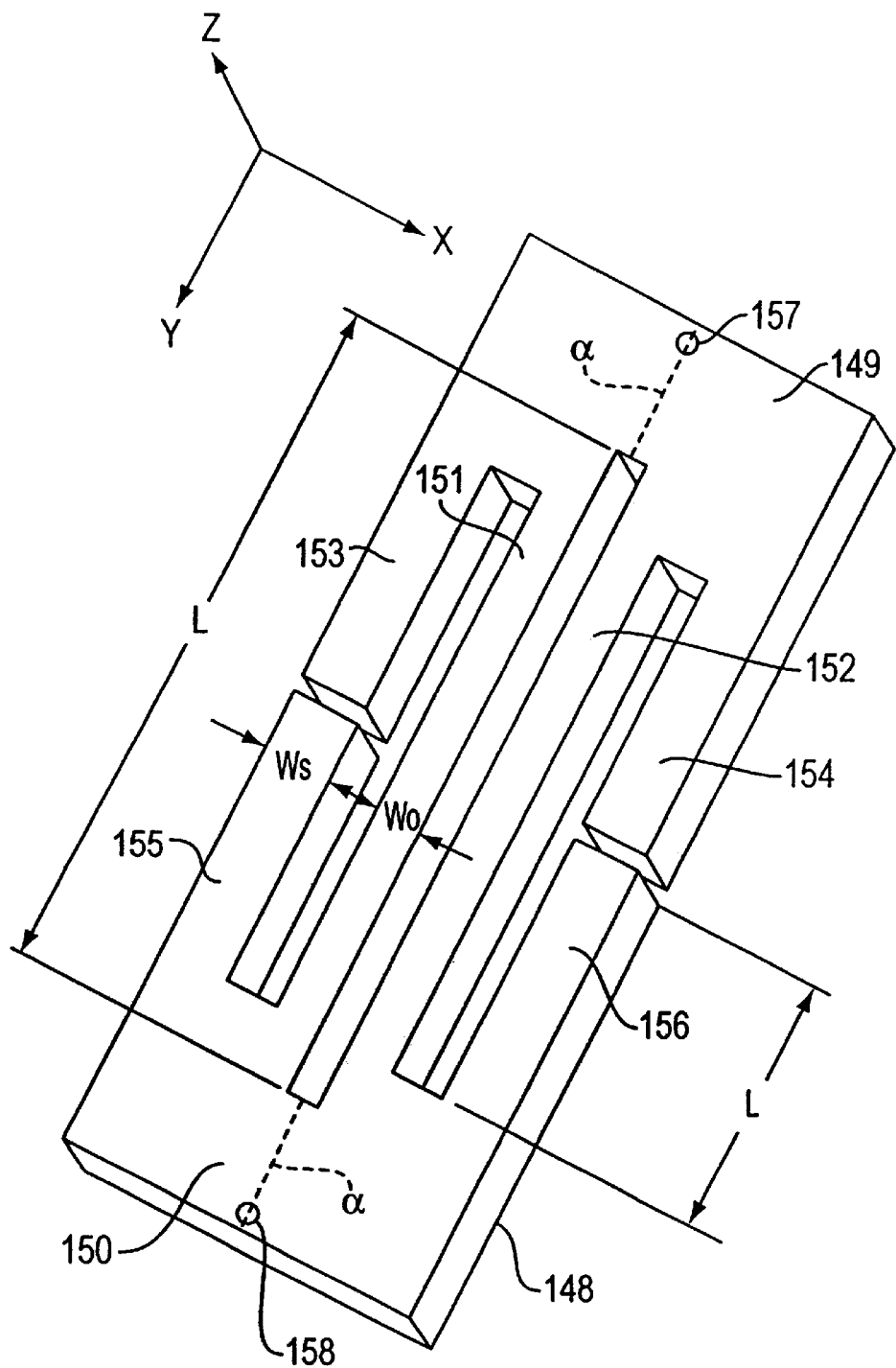
FIG. 31 is a perspective view showing a modified example of the same sensor.

In FIG. 31, inside two oscillating arms 151, 152 are continuous, and they are used as the oscillating arms of the driving tuning fork, and outside two oscillating arms are cut in the middle, and four oscillating arms 153, 154, 155, 156 of detecting side tuning fork are formed, so that the same constitution and operation may be realized.

Figure 27:
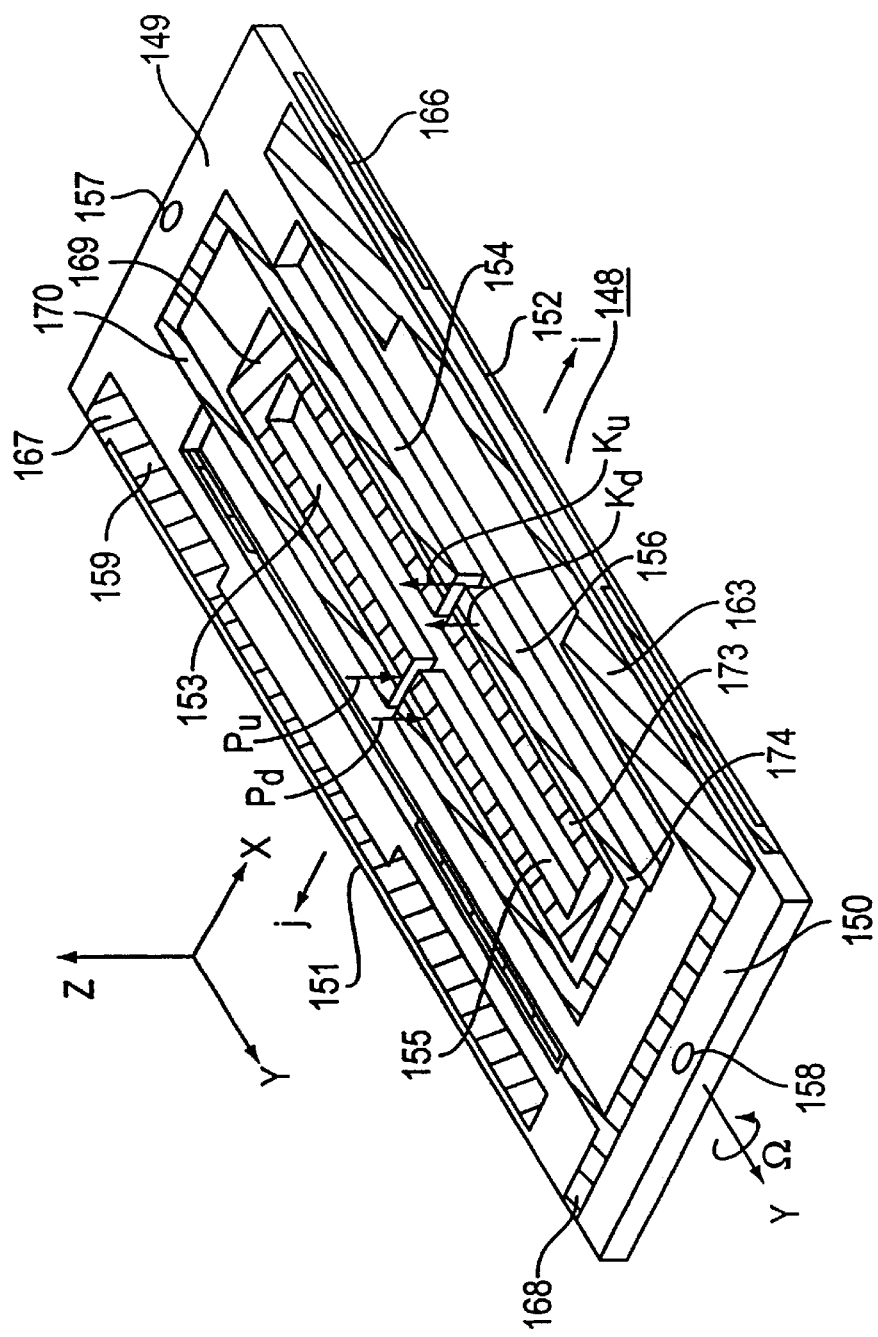
FIG. 27 is an electrode configuration diagram of the same sensor.
Figure 28:
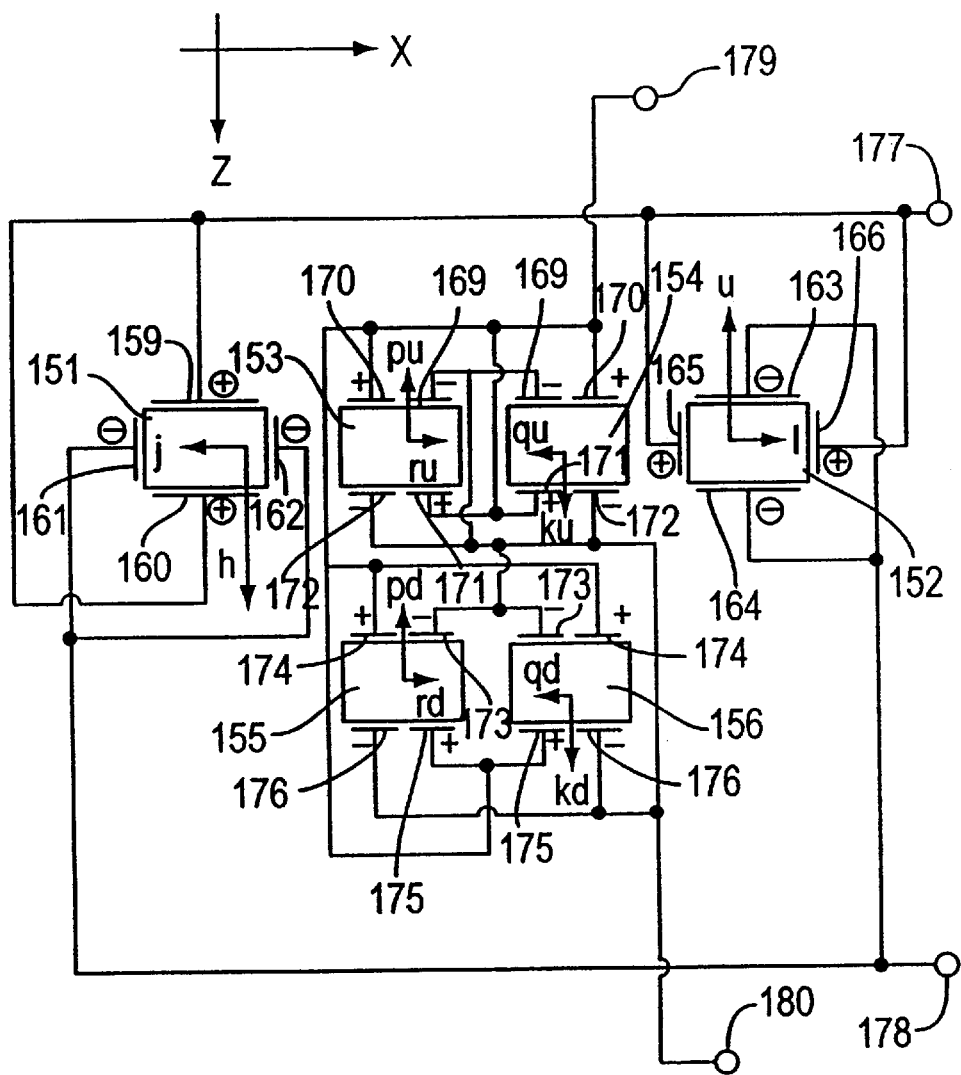
FIG. 28 is an electrode configuration and wiring diagram of the same sensor.
Figure 29:
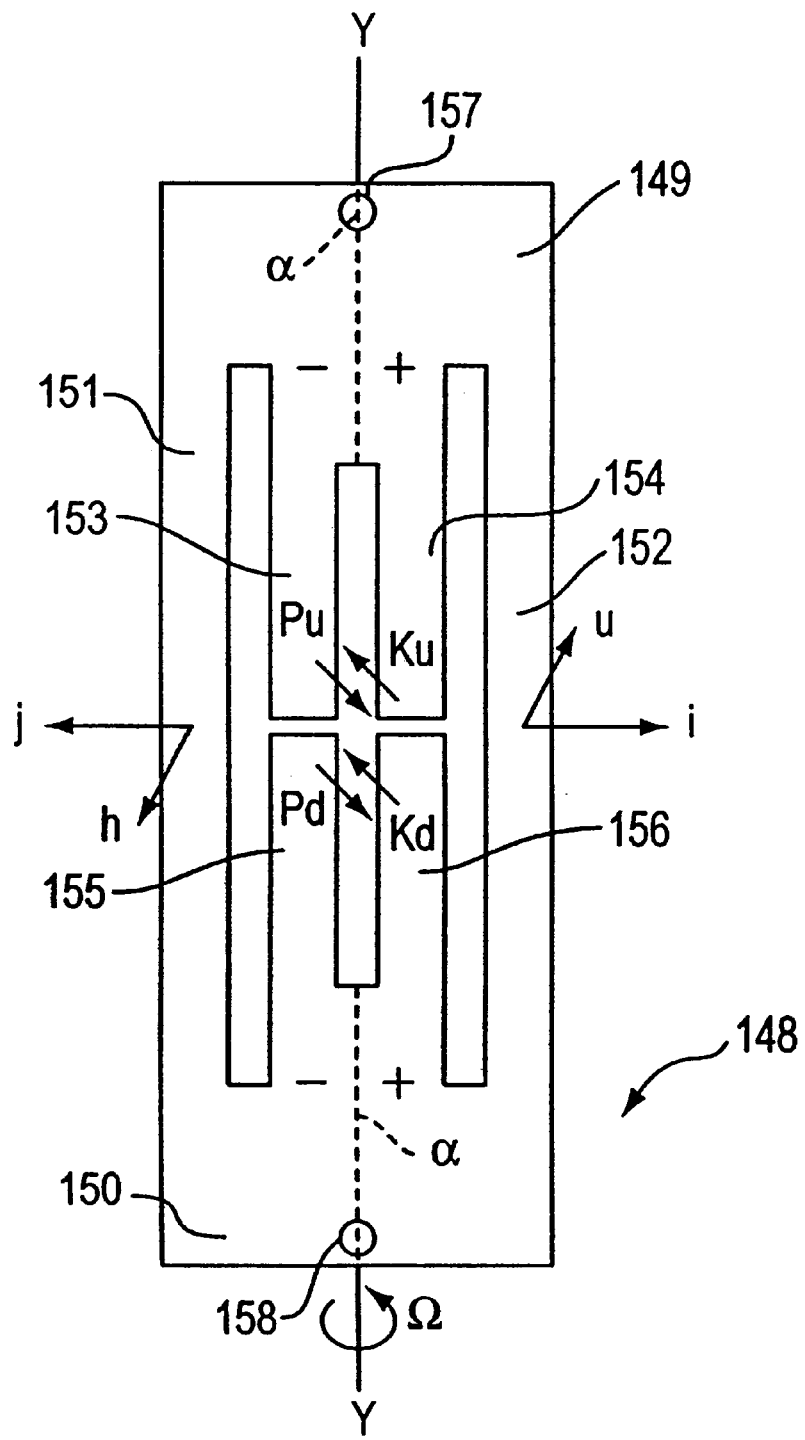
FIG. 29 is a diagram showing mechanical operation of the same sensor.

FIG. 27 and FIG. 28 shows the electrode and terminal structure of the tandem shaped compound tuning fork shown in FIG. 24 and FIG. 25. In one driving side oscillating arm 151, + side driving electrode 159, 160 are formed on face and back surfaces, and – side driving electrodes 161, 162 on both side surfaces, and in other driving side oscillating arm 152, – side driving electrodes 163, 164 are formed on face and back surfaces, and + side driving electrodes 165, 166 on both side surfaces, with the middle parts of the oscillating arms made thin for connection. In the middle parts, however, the efficiency may be superior as the driving electrodes by arranging so that the pattern may be twisted at the middle from the lower part by 90 degrees to connect and move to the adjacent surfaces respectively and return to the original surface when moving to the upper part.

Moreover, in the two oscillating arms 153, 154 and support member 149 of the upper inside detecting side tuning fork, – side detecting electrode 169 is provided at the inner side and + side detecting electrode 170 at the outer side on the face surface, and + side detecting electrode 171 at the inner side and – side detecting electrode 172 at the outer side on the back surface.

In the two oscillating arms 155, 156 and support member 150 of the lover inside detecting side tuning fork, – side detecting electrode 173 is provided at the inner side and + side detecting electrode 174 at the outer side on the face surface, and + side detecting electrode 175 at the inner side and – side detecting electrode 176 at the outer side on the back surface.

Still more, the + side driving electrodes 159, 160, 165, and 166 of the driving side tuning fork are connected to a driving terminal (D) 177, – side driving electrodes 161, 162, 163, 164 to a driving reference terminal (DGND) 178, + side driving electrodes 170, 171, 174, 175 of the detecting side tuning fork to a detecting terminal (S) 179, and − side detecting electrodes 169, 172, 173, 176 to a reference terminal (GND) 180.

Figure 30:
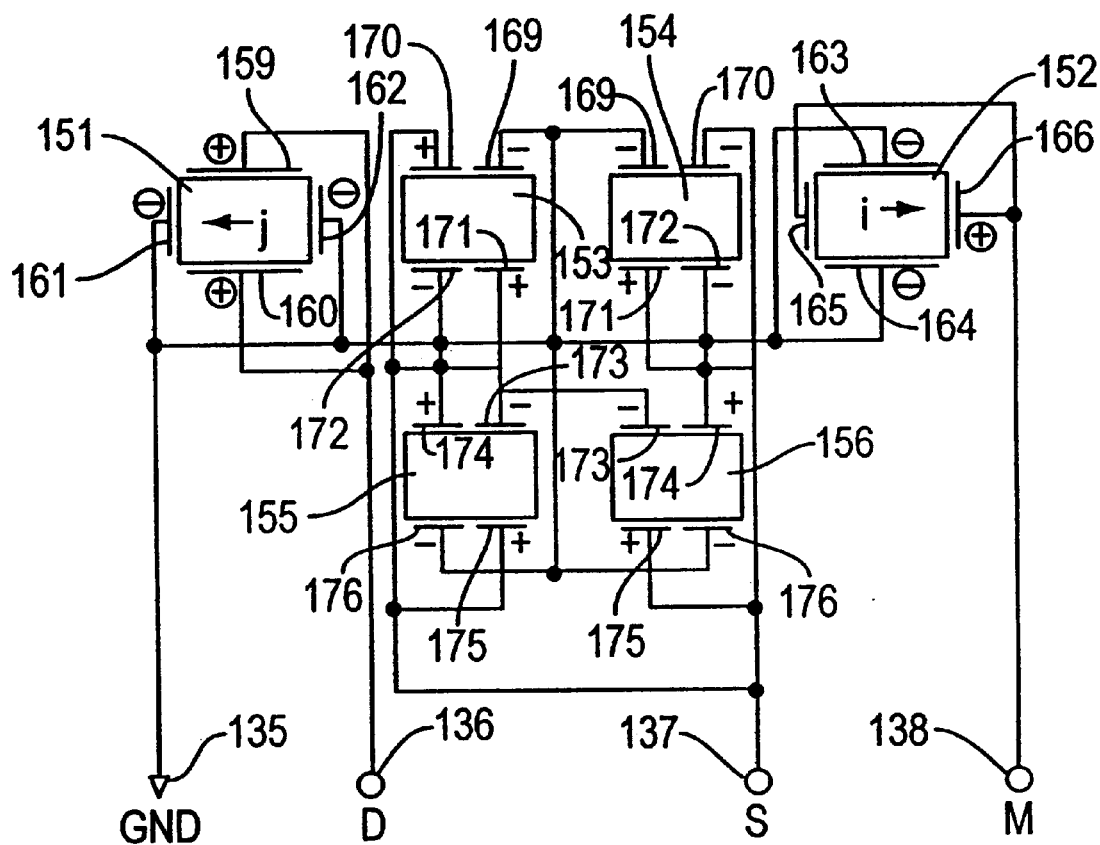
FIG. 30 is an electrode configuration and wiring diagram of the same sensor.

FIG. 30 is an electrode wiring diagram in the case of driving and detecting this angular velocity sensor in monitor method.

Figure 26:
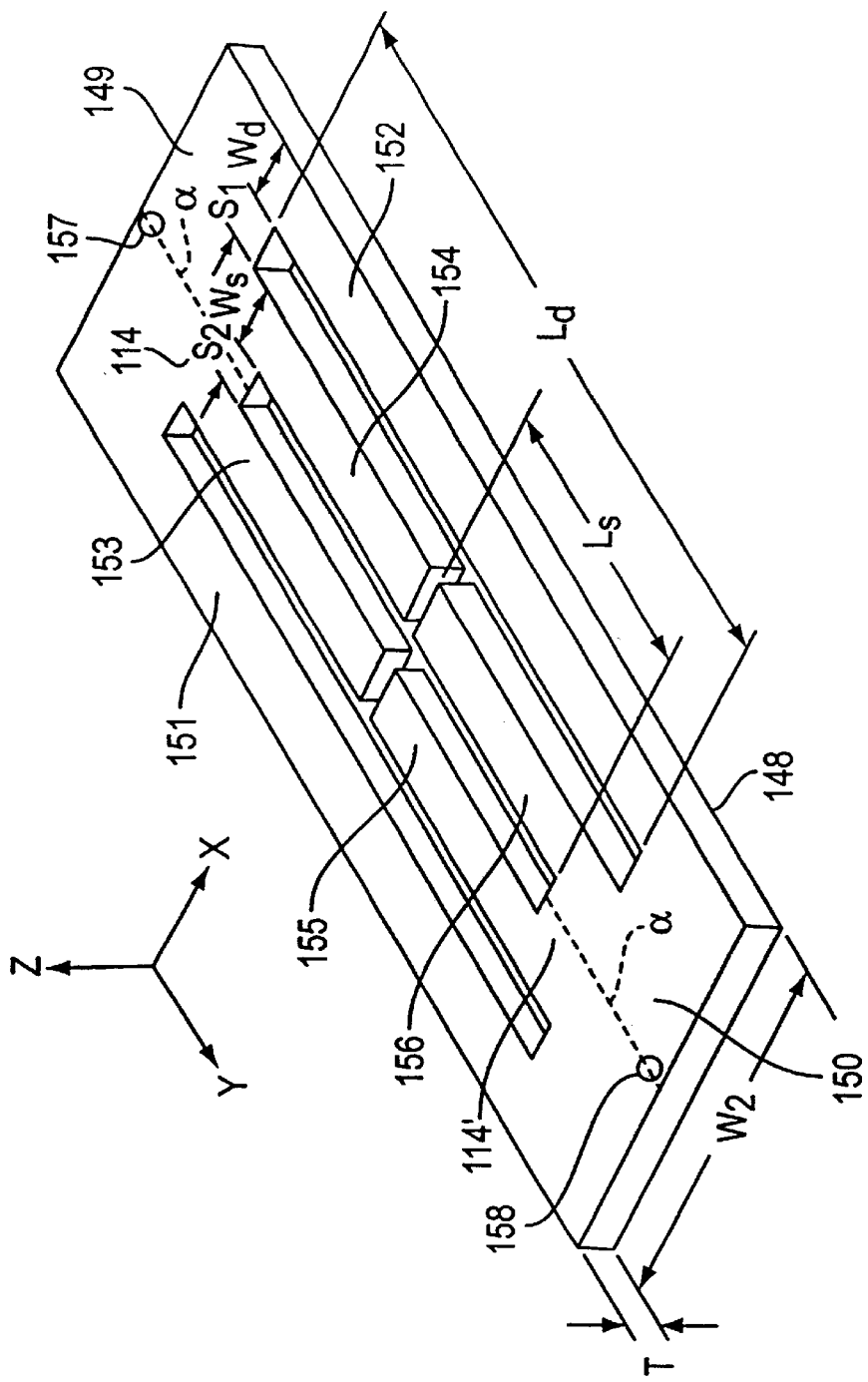
FIG. 26 is a dimension setting diagram of the same sensor.

For the tandem shaped compound tuning fork, processing by wire saw or blade saw is difficult, but by machining process such as sand blasting or etching technique such as photolithography, this structure more complicated than the comb shape can be formed at same cost, FIG. 26 shows the dimensional diagram of the tandem shaped angular velocity sensor, in which the dimensions are set, for example, as follows.

Length of oscillating arms 151, 152 of driving side tuning fork . . . $L_d$=22.00 mm Width of oscillating arms 151, 152 of driving side tuning fork . . . $W_d$=0.62 mm Length of oscillating arms 153 to 156 of detecting side tuning fork . . . $L_S$=9.74 mm Width of oscillating arms 153 to 156 of detecting side tuning fork . . . $W_S$=0.80 mm Thickness of tandem shaped tuning fork . . . T=0.70 mm Width of entire tandem shaped tuning fork . . . $W_2$=5.00 mm Slit interval of oscillating arms between driving side and detecting side . . . $S_1$=0.50 mm Slit interval of oscillating arms of detecting side tuning fork . . . $S_2$=0.40 mm The above dimension setting provides dimensions belonging to the angular velocity sensor intended to be nearly same in resonance frequency $f_{Xd}$ of XD oscillation and resonance frequency $f_{XS}$ of XS oscillation, and different in resonance frequency $f_{ZS}$ of ZS oscillation, and it is designed to be $f_{Xd}$=$f_{XS}$=6766 Hz, and $f_{ZS}$=5251 Hz.

Or, only by decreasing the width of the oscillating arms 112, 115 of the driving side tuning fork to be set in $f_{Xd}$=5275 Hz, and the dimension setting provides dimensions belonging to the angular velocity sensor intended to be nearly equal in the resonance frequency $f_{Xd}$ of XD oscillation and resonance frequency $f_{XS}$ of XS oscillation, and also nearly equal in the resonance frequency $f_{ZS}$ of ZS oscillation.

By using such tandem shaped compound tuning fork, the sensitivity of about 2.1 times that of the angular sensor using comb shaped tuning fork is obtained.

INDUSTRIAL APPLICABILITY

As described herein, the angular velocity sensor of the invention is a comb shaped tuning fork comprising a plurality of parallel tuning fork oscillating arms with a common support member, being held on the nodal line α of oscillation in the longitudinal direction of tuning fork and near the end surface of the support member, and therefore the oscillation transmission efficiency is excellent and the detecting sensitivity can be enhanced. Moreover, since the functions are separated and used, by using two of the four comb shaped oscillating arms for driving and other two for detecting, invasion of driving signal into detecting side is prevented, and moreover by the partial polarization and partial electrode system making use of the features of the ceramic piezoelectric material, removal of floating capacity and removal of undesired oscillation of support member are achieved, so that the electrical and mechanical S/N may be notably improved. Further, being of ceramic integrally formed tuning fork, as compared with the prior art, the number of tuning forks is double, and the shape and dimensions of tuning forks are set so as to achieve flexural oscillation and have the relation of $f_{DX}$=$f_{SX}$, $f_{DX}$=$f_{SZ}$, so that the temperature drive due to enhancement of sensitivity is very small, and leak current of driving signal to the detecting side is suppressed, and the angular velocity sensor of high performance and stable ceramic piezoelectric type compound angular velocity sensor is presented.

Besides, stable self-oscillation by monitor driving system suited to compound type tuning fork, improvement of S/N by separation of monitor current derived from $Z_{MS}$, and other practical effects are expected, and since the lower part or both ends of the support member are held on the nodal line α of oscillation in $Z_S$ mode of detecting side tuning fork, it can withstand 5000 G in impact test and 3 m in drop test, and therefore it can be used for automobile, and quantity is expected, and it can be manufactured at low cost and the industrial value is outstanding. Moreover, it can be manufactured in compound tuning fork structure in comb shape or tandem shape, and by optimally selecting the direction of tuning fork to the direction of anisotropy of crystal, near-resonance relation design of resonance frequency of each oscillation, and driving detection method, it is possible to achieve (1) smaller size, higher sensitivity, and hence reduction of cost for noise measure in the circuit, substrate and casing, (2) stability of sensitivity, (3) reduction of offset (4), reduction of offset temperature drift, (5) reduction of external translation acceleration sensitivity, (6) enhancement of reliability against external impact, and (7) enhancement of efficiency of crystal material.

Reference Numerals

1, 2 Oscillating arms
3, 4 Driving electrodes
5 Base
6, 7 Detecting electrodes
11, 12 Driving side oscillating arms
13, 14 Detecting side oscillating arms
15 Support member of driving side tuning fork
16 Support member of detecting side tuning fork
17, 17' Root of driving oscillating arm
18 Root of detecting oscillating arm
19 Notch or hole for holding or mounting lover part of support member
20, 21 Driving electrodes
22, 23 Detecting electrodes
24, 25 Input terminals of driving electrodes
26, 27 Output terminals of detecting electrodes
28 GND electrode
29 Driving electrode (D)
30 Detecting electrode (S)
31 Monitor electrode
32, 33 Current amplifiers of monitor circuit
34, 35 AC voltage amplifiers
36 Driving voltage controller
37 AC/DC converter
38 Zero cross comparator
39 Orthogonal detector
40 Integral DC amplifier
110 Compound tuning fork of comb shape
111 Support member
112 to 115 Oscillating arms
116 to 123 Driving electrodes
126 to 129 Detecting electrodes
130, 135 Driving terminals
131 Driving reference terminal
132, 137 Detecting terminals 133, 138 Reference terminals
134 Hole
136 Monitor terminal
139 Current amplifier
140 Charge amplifier
141, 142 AC voltage amplifiers
143 Driving voltage controller
144 AC/DC converter
145 Zero cross comparator
146 In-phase detector
147 Integral filter
148 Compound tuning fork in tandem shape
149, 150 Support members
151 to 156 Oscillating arms
157, 158 Holes
159 to 166 Driving electrodes
169 to 176 Detecting electrodes
177 Driving terminal
178 Driving reference terminal
179 Detecting terminal
180 Reference terminal

What is claimed is:

1. An angular velocity sensor comprising four oscillating arms made of ceramic piezoelectric material or crystal material integrally formed with a common support member such that the transition between each of said oscillating arms and said common support member defines a respective root end for each oscillating arm, each of said oscillating arms and a portion of said common support member being polarized along a portion of a length of said angular velocity sensor in a thickness direction or width direction of said angular velocity sensor by an externally applied voltage thereby defining a polarized portion of said angular velocity sensor, wherein said angular velocity sensor is configured such that an outer set of two of said oscillating arms form a driving side tuning fork and an inner set of two of said oscillating arms form a detecting side tuning fork or the inner set of two of said oscillating arms form the driving side tuning fork and the outer set of two of said oscillating arms form the detecting side tuning fork, said angular velocity sensor further comprising driving electrodes divided in two sections along a longitudinal axis of said angular velocity sensor disposed on face and back surfaces of the driving side tuning fork and common support member, and detecting electrodes along said longitudinal axis of said angular velocity sensor disposed on face, back and side surfaces of the detecting side tuning fork and support member, wherein said angular velocity sensor is configured such that an alternating current signal applied to the driving electrodes of the driving side tuning fork generates flexural oscillations in mutually reverse phases in the width direction of said angular velocity sensor and said common support member is mechanically coupled to said detecting side tuning fork to induce flexural vibrations in mutually reverse phases, whereby an electric charge quantity is generated by flexural vibrations in mutually reverse phases in the thickness direction of said annular velocity sensor generated by the Coriolis force based on the rotation angular velocity about said longitudinal axis of said angular velocity sensor applied from outside, wherein said electric charge quantity is detected by the detecting electrodes of the detecting side tuning fork.

2. An angular velocity sensor of claim 1, wherein, for each of said oscillating arms of said driving side tuning fork, said polarized portion of said angular velocity sensor is defined as the sum of about 50% to 80% of a length of a respective oscillating arm of said driving side tuning fork extending from the root end of said respective oscillating arm in a first direction and about a length corresponding to the width of the respective oscillating arm extending from said root end of said respective oscillating arm in a second direction, and for each of said oscillating arms of said detecting side tuning fork, said polarized portion of said angular velocity sensor is defined as the sum of about 50% to 80% of a length of a respective oscillating arm of said detecting side tuning fork extending from the root end of the respective oscillating arm in a first direction and about a first length corresponding to the width of the driving side oscillating arm plus a second length extending from said root end of said respective oscillating arm in a second direction opposite to said first direction, said second length measured by the distance between said root end of an oscillating arm of said driving side tuning fork and said root end of said respective oscillating arm of said detecting side tuning fork.

3. An angular velocity sensor of claim 1, wherein the four oscillating arms and common support member are configured so as to be equal in the resonance frequency in $X_D$ mode of driving side tuning fork and resonance frequency in $X_S$ mode of detecting side tuning fork, and nearly equal in the resonance frequency in $Z_S$ mode generated by Coriolis force.

4. An angular velocity sensor of claim 1, wherein the four oscillating arms and common support member are configured so as to be equal in the resonance frequency in $X_D$ mode of driving side tuning fork and resonance frequency in $X_S$ mode of detecting side tuning fork, and different in the resonance frequency in $Z_S$ mode generated by Coriolis force.

5. An angular velocity sensor of claim 1, wherein the four oscillating arms and common support member are configured so that the resonance frequency in $X_D$ mode of driving side tuning fork may be different from the resonance frequency in $X_S$ mode of detecting side tuning fork, and nearly equal to the resonance frequency in $Z_S$ mode generated by Coriolis force.

6. An angular velocity sensor of claim 1, wherein a notch or a tiny hole is provided in a lower part of the common support member for holding or mounting said angular velocity sensor, said notch or tiny hole positioned on a nodal line of oscillation in a length direction of the detecting side tuning fork.

7. An angular velocity sensor of claim 1, further comprising a constant AC current control circuit for applying an AC signal to one driving electrode of one oscillating arm of the driving side tuning fork, and holding constant the amplitude of said AC signal in $X_D$ mode induced in a monitor electrode, said monitor electrode is a functional expression of the other driving electrode of the other oscillating arm of the driving side tuning fork.

8. An angular velocity sensor of claim 7, wherein a timing signal for detecting and extracting the AC signal induced in said monitor electrode by the rotational angular velocity about the the longitudinal axis of said angular velocity sensor applied from outside is generated from a zero cross signal of the AC signal induced on the monitor electrode.

9. An angular velocity sensor comprising:
   at least four oscillating arms, wherein at least two of said oscillating arms form a driving side tuning fork and at least two of said oscillating arms form a detecting side tuning fork;
   a support member coupled to each of said at least four oscillating arms;
   at least two driving electrodes coupled to said driving side tuning fork; and
   at least two detecting electrodes coupled to said detecting side tuning fork, wherein only a portion of said angular velocity sensor is polarized.

10. The angular velocity sensor of claim 9, wherein said at least two driving electrodes and said at least two detecting electrodes are coupled only to said portion of said angular velocity sensor.

11. The angular velocity sensor of claim 9, wherein said portion of said angular velocity sensor includes a portion of said support member and a portion of each of said at least four oscillating arms.

12. The angular velocity sensor of claim 9, wherein said angular velocity sensor is formed from a ceramic piezoelectric material.

13. The angular velocity sensor of claim 9, wherein said at least two driving electrodes and said at least two detecting electrodes are coupled to a portion of said support member.

14. The angular velocity sensor of claim 9, further comprising a controller, said controller configured to apply a drive voltage to said angular velocity sensor such that a oscillation level of said angular velocity sensor is kept constant.

15. The angular velocity sensor of claim 9, wherein said at least four oscillating arms comprise at least two outer oscillating arms and at least two inner oscillating arms.

16. The angular velocity sensor of claim 15, wherein said at least two outer oscillating arms comprise the driving side tuning fork and said at least two inner oscillating arms comprise the detecting side tuning fork, and further wherein said at least two outer oscillating arms have a larger volume than said at least two inner oscillating arms.

17. The angular velocity sensor of claim 15, wherein said at least two outer oscillating arms comprise the detecting side tuning fork and said at least two inner oscillating arms comprise the driving side tuning fork, and further wherein said at least two inner oscillating arms have a larger volume than said at least two outer oscillating arms.

* * * * *